(12) United States Patent
Koike-Akino et al.

(10) Patent No.: US 11,249,181 B2
(45) Date of Patent: *Feb. 15, 2022

(54) LOCALIZATION USING MILLIMETER WAVE BEAM ATTRIBUTES FOR KEYLESS ENTRY APPLICATIONS

(71) Applicant: Mitsubishi Electric Research Laboratories, Inc., Cambridge, MA (US)

(72) Inventors: Toshiaki Koike-Akino, Cambridge, MA (US); Pu Wang, Boston, MA (US); Milutin Pajovic, Boston, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/708,413

(22) Filed: Dec. 9, 2019

(65) Prior Publication Data

US 2021/0149039 A1    May 20, 2021

Related U.S. Application Data

(63) Continuation-in-part of application No. 16/689,431, filed on Nov. 20, 2019.

(51) Int. Cl.
*H04B 7/06* (2006.01)
*G01S 13/76* (2006.01)
(Continued)

(52) U.S. Cl.
CPC .......... *G01S 13/762* (2013.01); *B60R 25/252* (2013.01); *G01S 13/878* (2013.01);
(Continued)

(58) Field of Classification Search
CPC ... H04W 4/33; H04W 17/318; H04W 17/336; H04W 4/26; H04W 24/08; H04B 7/0408;
(Continued)

(56) References Cited

U.S. PATENT DOCUMENTS

| 2016/0021549 A1* | 1/2016 | Subramanian | ........ H04W 76/10 370/329 |
|---|---|---|---|
| 2019/0097712 A1* | 3/2019 | Singh | ....................... H04B 7/04 |

* cited by examiner

*Primary Examiner* — Minh Trang T Nguyen
(74) *Attorney, Agent, or Firm* — Gennadiy Vinokur; Hironori Tsukamoto

(57) ABSTRACT

A system for keyless entry applications using beamforming transmission in a millimeter wave spectrum in an environment. A memory with data including values indicative of link attributes associated with beam signal measurements with states of devices and states of environments. The states of the devices for each device including types of user behavior, locations and poses in each environment. Control circuitry performs beam training with a target device associated with at least one keyless entry application in the environment to measure beam signal values and environmental responses for different beams transmitted over the different beam angles. Selects, in response to the beam training, at least one dominant angle for a beamforming communication with the target device. Estimates, a state of the target device associated with the at least one keyless entry application or a state of the environment, corresponding to environmental responses for different beams estimated during the beam training.

18 Claims, 18 Drawing Sheets

(51) Int. Cl.
*H04B 7/08* (2006.01)
*B60R 25/25* (2013.01)
*H01Q 3/02* (2006.01)
*G01S 13/87* (2006.01)

(52) U.S. Cl.
CPC ............ *H01Q 3/02* (2013.01); *H04B 7/0617* (2013.01); *H04B 7/0626* (2013.01); *H04B 7/086* (2013.01)

(58) Field of Classification Search
CPC .. H04B 7/0491; H04B 7/0617; H04B 7/0626; H04B 7/086; H04B 7/0684; G01S 13/762; G01S 13/878; B60R 25/252
See application file for complete search history.

*(Fingerprinting using Beam Attributes)*

405B (AP #2)
405C (AP #3)
405A (AP #2)
489 *(Car User mobile communication device for fingerprinting includes location, orientation and height)*

| Time #1 | AP1 | AP2 | AP3 |
|---|---|---|---|
| Beam #1 | 42 | 28.3 | 31 |
| Beam #2 | 43 | 26.4 | 32 |
| ........ | 42 | 23.6 | 31.3 |
| Beam #B | 41.2 | 28.5 | 39.6 |

| Time #2 | AP1 | AP2 | AP3 |
|---|---|---|---|
| Beam #1 | 41.2 | 23.5 | 31.2 |
| Beam #2 | 43.2 | 22.4 | 32.6 |
| ........ | 42.8 | 26.8 | 33.2 |
| Beam #B | 42.6 | 25.6 | 36.2 |

| Time #N | AP1 | AP2 | AP3 |
|---|---|---|---|
| Beam #1 | 42.2 | 28.2 | 31.8 |
| Beam #2 | 43.8 | 24.6 | 35.2 |
| ........ | 43.2 | 23.2 | 32.1 |
| Beam #B | 41.3 | 25.8 | 36.9 |

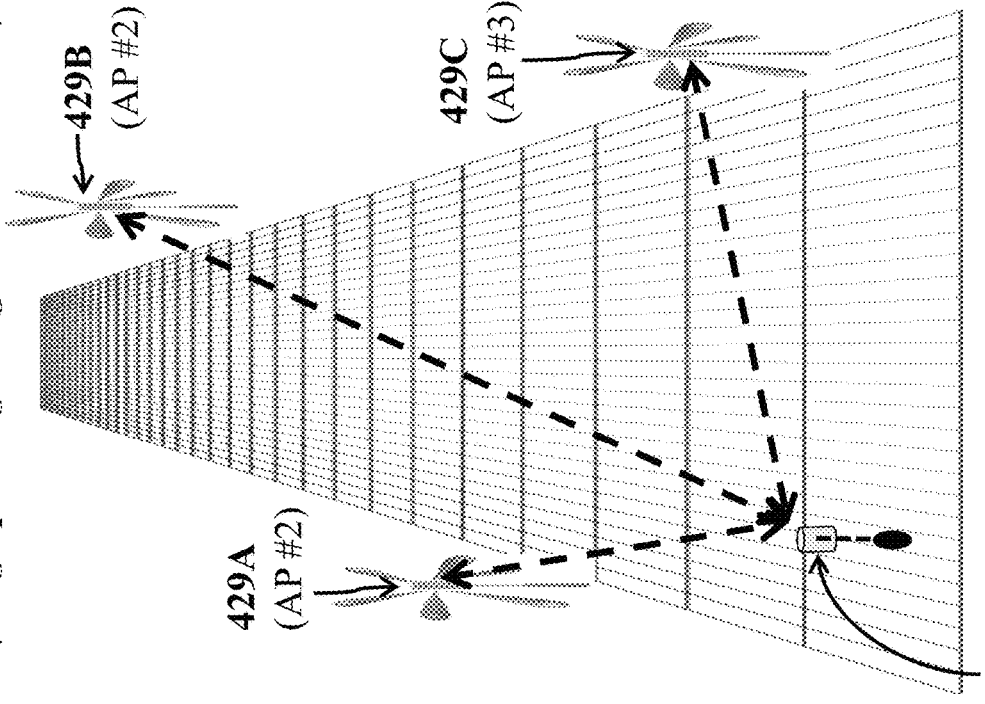

LOCALIZATION USING MILLIMETER WAVE BEAM ATTRIBUTES FOR KEYLESS ENTRY APPLICATIONS

FIELD

The present disclosure relates generally to communications systems, and more particularly to millimeter wave fingerprinting-based indoor and outdoor localization with beam signal measurements for assisting with Keyless Entry Applications in determining a mobile device distance to a vehicle.

BACKGROUND

Conventional keyless entry systems perform locking and unlocking operations for a door of a vehicle using radio communication between a vehicle device and a mobile communication device. Some conventional passive keyless entry systems perform locking and unlocking operations of a door of a vehicle, as identification (ID) codes preset in each mobile communication device and are verified by performing communication between the vehicle device and the mobile communication device, when the mobile communication device approaches a an approximate distance to the vehicle.

In particular, in these types of conventional passive keyless entry systems it is important to determine whether the mobile communication device is positioned inside or outside of the vehicle. For this reason, in the vehicle device, a plurality of transmitting antennas is provided in each place of the vehicle. When the mobile communication device receives radio wave from the transmitting antenna inside the vehicle, it is determined that the mobile communication device is inside the vehicle. When the mobile communication device receives radio wave from the transmitting antenna outside the vehicle, it is determined that the mobile communication device is outside the vehicle.

However, in the conventional keyless entry systems, the determination of the position of the mobile communication device is not sufficiently accurate. For example, as a radio wave leaks from the transmitting antenna inside the vehicle, the mobile communication device may incorrectly determine that the mobile communication device is inside the vehicle when the mobile communication device is in fact outside the vehicle. On the contrary, as a radio wave leaks from the transmitting antenna outside the vehicle, the mobile communication device may incorrectly determine that the mobile communication device is outside the vehicle when the mobile communication device is in fact inside the vehicle. When a transmission power of radio wave from the transmitting antenna is weakened to prevent the leakage of the radio wave, the mobile communication device occasionally cannot receive radio wave even though the portable device is inside the vehicle, which may cause incorrect determination. Thus, the determining accuracy of the position of the mobile communication device is not sufficient.

In addition, the determination of the position of the mobile communication device is not limited to the inside and outside of the vehicle; the position of the mobile communication device may be determined whether it is inside or outside of a place separated from a door at a predetermined distance. In this case, for example, it is possible to turn on a lamp or some other device when the mobile communication device gets close to the door within the predetermined distance. For this reason, a keyless entry system is required to make the determination of the position of the mobile communication device no matter if located inside or outside of the vehicle, but more importantly, make the determination that the mobile communication device is located at a predetermined interface or distance from the lamp or some other device.

At least one reason these conventional keyless entry systems fail to determine a proper distance and/or location of the mobile communication device to the vehicle can be due to using a conventional antenna that is limited in range and usage. Single element monopole type elements are susceptible to the scattering centers on the vehicle. The resulting antenna response can be fluctuating as a function of angle of arrival for signals of interest, especially in an urban environment on a moving vehicle. Some conventional keyless entry systems have tried to overcome these limitations by mounting antennas at different locations on the vehicle. However, these conventional keyless entry systems also fail, like other the conventional keyless entry systems have failed, in making the proper determination of the distance of the mobile communication device to the vehicle.

Therefore, there is a need for indoor and outdoor localization systems and methods that can utilize infrastructure-free communication devices to construct a feature space for a location-dependent fingerprinting database, from low cost and implementation perspectives that can assist with keyless entry into a vehicle.

SUMMARY

The present disclosure relates to methods and systems for mm Wave fingerprinting-based indoor and outdoor localization with mm Wave beam attributes including, but not limited to, (1) beam signal-to-noise ratio (SNR) measurements or (2) received signal strength indicator (RSSI) measurements along with beam indices the transceivers on both ends use to establish mm Wave link. In industrial standards (e.g., IEEE 802.11ad and 802.11ay), such mm Wave beam attributes are required to be measured at access points (APs) and clients (e.g., cell phones or laptops) in order to establish reliable mm Wave communication links.

The mm Waves exhibit unique propagation characteristics, such as having smaller wavelengths and an antenna size that is much smaller, wherein more antennas may be packed in a relatively small area, thereby allowing for the implementation of a high-gain antenna in small form factor. Further, the mm Waves can be used for localizing an object in an enclosed indoor area or in an outdoor area. The object can be a mobile communication device that transmits and/or receives signals to/from some other device(s), or an entity without such a capability. The localizing refers to estimating the coordinates of an object in some pre-defined reference frame, such as a vehicle location, and a mobile communication device location. Localization, alternatively, is a proximity detection problem, that aims to localize an object at a sub-area level, within a larger indoor area, and an outdoor area. Thus, using mm Waves associated with keyless entry can solve the conventional keyless entry problems, by accurately determining a location, as well as distance of the mobile communication device to a vehicle.

In particular, some embodiments use intermediate channel measurements, e.g., spatial beam SNRs that are inherently available in the IEEE 802.11ad and 802.11 ay standard, to construct a feature space for a location-dependent fingerprinting database. Through experimentation, at least one realization realized is that the use of spatial beam SNRs, conveniently available during a beam-training phase in 5G and 802.11ad standards, can be used as location fingerprints with zero overhead. More specifically, during a so-called beam-training phase, a pre-determined set of varying spatial beam patterns can be used to probe the environment. Such that, for each probing beam pattern, a spatial beam SNR is recorded and the beam pattern yielding a strongest beam, SNR can be selected for subsequent data transmission. Wherein, based on the availability of open source software, the open source software framework can be used to extract such beam SNR measurements (e.g., at 60-GHz Wi-Fi band), to build an experimental platform consisting of multiple APs, that can be used to collect comprehensive indoor measurements in an environment. Note that these measurements, i.e. real-world measurements, can account for hardware constraints such as quantization of beam SNR values (e.g., beam SNRs that are acquired at a resolution of 0.25 dB) and non-ideal system factors such as non-ideal antenna beam patterns and irregular antenna housing. Thus, with these real-world beam SNR measurements at several locations-of-interest within the environment, a fingerprinting dataset can be constructed in an offline training phase. For an online localization phase, both position classification and coordinate estimation can be considered using statistical estimation and machine learning approaches.

In regard to the fingerprinting dataset, at least one embodiment can construct the fingerprinting dataset using the SNR measurements, as noted above. Wherein data is stored in a memory including values indicative of the SNR measurements of a set of beams emitted at different beam angles by the phased antenna array and measured at a set of locations and orientations, that provide for a mapping between different combinations of SNR values of the set of beams and the set of locations and orientations. Such that a location and orientation from the set of locations is mapped to a unique combination of the SNR values of the set of beams.

However, discovered from experimentation, is that other measurements can be used to construct the fingerprinting dataset in the offline training phase, aside from just using the SNR measurements. For examples, the other measurements may be one or a combination of, beam RSSI measurements, beam channel state information (CSI) measurements, SNR measurements, RSSI measurements, CSI measurements, beam patterns, beam sequencing, and packet information (timing, sequencing). Wherein, at least one embodiment can construct the fingerprinting dataset using these other measurements, i.e. one or a combination of, as values indicative of measurements of a set of beams emitted at different beam angles by the phased antenna array and measured at a set of locations and orientations, that provide for a mapping between different combinations of values of the set of beams and the set of locations and orientations. Wherein a location and orientation from the set of locations and orientations can be mapped to a unique combination of the SNR values of the set of beams.

Also, discovered from experimentation is that the stored data can also be used as values indicative of "beam attributes". The "beam attributes" may be associated with the beam signal measurements with states of devices and/or states of environments.

The "states of the devices" can include types of behavior associated with each device (wherein a user can be associated with each device), locations and poses of each device in each environment. For example, each device can be associated with a user, such that the user is one of a robot, a human, a computer, a computer like device or an electronic device adaptable to a human. Wherein some types of behavior associated with each device can include, by-non limiting example: (1) locations and poses of a specific user holding a device in the environment; (2) a device may be attached, embedded or somehow part of a human, i.e. maybe an implant, a component of a prosthetic, etc., such that locations and poses of the human with the device can be obtained; (3) a device could be a computer device that is static or dynamic within an environment, i.e. commercial or business environment, including manufacturing, hospital, assembly line, transportation system, product transportation, i.e. the computer device could be part of a tracking/monitoring network, etc.; (4) a device could be adaptable to a human such as part of a wrist device, or some other types of devices or clothing worn by a human; and (5) a device can be a mobile communication device of a user attempting to access a vehicle via keyless entry.

The "states of environments" can include locations of physical objects and types of behavior of ambient users in each environment. The locations of physical objects in each environment, can include objects found in a particular type of environment. By-non-limiting example: (1) in an office environment, the objects may include furniture, pillars, doors, machinery, robots, etc.; and (2) in an industrial or manufacturing environment, the objects can include any component either static or dynamic within the environment. As noted above, a user may be one of a robot, a human, a computer, a computer like device or an electronic device adaptable to a human. Wherein, by-non-limiting example, the types of behavior of ambient users can include: (1) a robot, i.e. a static robot having moving components or a dynamic robot, movements within the environment; (2) a human or a group of humans movement within the environment; (3) a computer maybe associated with a dynamic device that moves within the environment; (4) an electronic device adaptable to static devices having moving components, mobile devices, humans, etc., that are located in an the environment, i.e. commercial, business or residential.

According to some embodiments of the present disclosure, the fingerprinting dataset in the offline training phase is stored in a memory, and can be used, by non-limiting example, with control circuitry connected to the phased antenna array and the memory. Wherein, the control circuitry performs a beam training with a target device located in the environment to measure beam signal values and environmental responses for different beams transmitted over the different beam angles. In response to the beam training, selects at least one dominant angle for a beamforming communication with the target device. Estimates from the stored fingerprinting data in the memory, a state of a target device, a state of the environment, or a combination of both states corresponding to the environmental responses for different beams estimated during the beam training. Then, transmits the estimated states of the target device and environment using the phased antenna array via a beamforming transmission over the at least one dominant angle to communicate the state of the target device, the state of the environment, or both states.

EXPERIMENTATION

However, in order to better understand how and why some of the above embodiments were discovered, one needs to review the experimentation that led to some of the discoveries noted above. For example, at the start of experimentation some fingerprinting-based methods tested appeared to provide an efficient solution for online localization with low computational complexity. However, what was later discovered is that these fingerprinting-based methods all required an enormous amount of time and resources to construct an offline database with chosen fingerprinting features at locations-of-interest within an environment to enable fast online localization. Upon further review of these tested Wi-Fi-based fingerprinting systems, RSSI measurements were used as a feature to construct an offline training database, mostly because this is the most easily accessible measurement from IEEE 802.11ac devices at sub-6 GHz, and because of the low hardware requirements on data collection. Further, some machine learning methods such as the k-nearest neighbor (kNN) were applied to the RSSI-based fingerprinting data and showed some improved localization accuracy based on the particular experimentation. Some aspects learned from this experimentation revealed common issues using the RSSI, such as: 1) instability of using RSSI measurements at a given location; and 2) the coarse-grained channel information provided by the RSSI measurements. Also realized were further challenges that needed to be overcome, for example, the RSS are a coarse value, which only simply measures the received power for a whole channel. In other words, the RSS fluctuates over time in typical indoor environments with rich multipath effects and are not unique for a specific location.

Another experimentation tested included the use of full channel state information (CSI) for fingerprinting-based localization at 2.4-GHz and 5-GHz frequency bands. An initial impression was that it would be easier to obtain such CSI measurements from open-source Wi-Fi network interface cards (NICs), such as Intel Wi-Fi Link 5300 NIC. Wherein, these NICs provided subcarrier channel frequency responses (CFR) in an orthogonal frequency-division multiplexing (OFDM) system and captured a multipath effect via wideband channel responses. When compared with RSSI measurements experimentation, these CSI measurements appeared to be more stable and provide location-dependent features. One experimentation included using a Fine-grained Indoor Fingerprinting System (FIFS), the FIFS system leveraged a weighted average of CSI amplitudes over three antennas, that included different amplitudes and phases at multiple propagation paths, known as the frequency diversity, to uniquely manifest a location. Further, the multiple antennas appeared to also provide a spatial diversity that could be further augmented in fingerprinting.

Still, another experimentation tested included a deep learning based indoor fingerprinting system that used CSI, i.e. DeepFi. This experimentation used a DeepFi system architecture that included an off-line training phase and an on-line localization phase. In the off-line training phase, deep learning was utilized to train all the weights of a deep network as fingerprints. Where, a greedy learning algorithm was used to train the weights layer-by-layer to reduce complexity. In the on-line localization phase, a probabilistic method based on a radial basis function was used to obtain an estimated location. In the FIFS experimentation, the CSI amplitude values from three antennas were simply accumulated to produce an average value. In contrast, for the DeepFi experimentation had aimed to utilize their variability to enhance the training and test process in deep learning. For example, 30 subcarriers were treated as 30 nodes and used as input data of visible variability for deep learning. Wherein, with the three antennas, there were 90 nodes that could be used as input data for deep learning. Which seemed that the experimented DeepFi approach appeared to exploit 90 CSI amplitudes from all the subcarriers at all the three antennas with a deep auto-encoder network. However, upon reflection of developing the embodiments of the present disclosure was that the CSI measurements were available in 2.4/5 GHz communication systems, and online in mm Wave systems that are envisioned to dominate the future Wi-Fi market.

However, practical implementation of the CSI-based fingerprinting method later turned out to be very challenging when using with current mm Wave technology and communication standards. Namely, only a limited number of radio frequency (RF) chains were implemented into mm Wave transceiver due to hardware-related constraints. Which this precluded them from processing signals from all antenna elements in discrete-time domain and obtaining mm Wave channel angular spectrum. Instead, what was realized and required by industrial standards is that the mm Wave transceiver implements a finite number of possible beam patterns such that two mm Wave devices can establish a communication link based on probing different combinations of beams and choosing the best link based on the received signal quality. In addition, even those limited channel measurements were not (easily) accessible from commercial mm Wave chipsets, which posed additional challenges to mm Wave-aided localization.

Experimentation showed that in regard to higher frequency bands beyond 5-GHz frequency band, e.g., 28-GHz band for 5G wireless communications and 60-GHz for 802.11ad Wi-Fi, obtaining real-world fingerprinting measurements, such as full CSI, proved significantly more challenging and required dedicated prototyping device platforms. Namely, to acquire CSI in mm Wave receiver, a separate radio frequency (RF) chain was needed in each antenna element. In addition, due to the large bandwidth of mm Wave communication signals, an analog-to-digital converter (ADC) in each RF chain needs to have a relatively high sampling rate and, in turn, consume large amounts of power. Overall, after several types of experimentation, the resulting baseline consensus was that such a system would be too expensive and very impractical for commercial use with current mm Wave technology.

Discoveries & Realizations

What was discovered is that one of the unique features of these mm Wave applications was to employ high-resolution beam patterns, via either analog beamforming, or hybrid beamforming, which could be used to compensate for higher path loss. More specifically, during an experimental beam-training phase, a pre-determined set of varying spatial beam patterns were used to probe the environment. Such that, for each probing beam pattern, a spatial beam SNR was recorded, the beam pattern yielding the strongest beam SNR was selected for subsequent data transmission. For a given probing beam pattern, spatial beam SNR was a RSSI-like coarse-grained channel measurement. However, this turned out to be a benefit due to the use of multiple varying beam patterns, wherein a set of spatial beam SNRs can embed more spatial channel responses than the traditional RSSI measurement. Further still, another realized benefit is that the spatial beam SNRs were inherently available in the 5G and IEEE 802.11ad standard, which enabled a zero overhead for the overall hardware and software infrastructure.

Thus, based on different experimentation, spatial beam SNRs were decided to be used, for many reasons, one reason for being conveniently available during a beam training phase in 5G and 802.11ad standards, and can be used as location fingerprints at a zero overhead. Another reason is spatial beam SNRs can be based on open source software that is easily available, and the open source software framework could be used to extract 60-GHz beam SNR measurements. For example, an experimental platform was built consisting of multiple APs, in order to collect comprehensive indoor measurements in a test environment, i.e. the test environment was an office environment tested during regular office hours. Note that these real-world measurements accounted for hardware constraints such as quantization of the beam SNR values, e.g., beam SNRs were delivered with a resolution of 0.25 dB, and non-ideal system factors such as non-ideal antenna beam patterns and antenna housing. With these real-world beam SNR measurements at several locations-of-interest within the test environment, a fingerprinting dataset in the offline training phase was constructed. For the online localization phase, both position classification and coordinate estimation were undertaken using a weighted nearest neighboring and Gaussian process regression approaches, as noted above.

In an alternative embodiment, the locations of interest are fingerprinted using RSSI measurements of the established mm Wave link between two devices and indices of the built-in beam patterns the two devices use for establish such a link. The reason is that the RSSI and beam indices are more easily available from commercial devices than the SNR values of the probed beams. In addition, while it has been experimentally shown that fingerprint-based localization using RSSI measurements only does not provide satisfactory localization performance, including beam indices reduces the search space of indoor location and, in turn, considerably improves the localization performance.

Some embodiments include a system using beamforming transmission in a mm Wave spectrum in an environment. The system includes a phased antenna array that performs beamforming to establish millimeter wave channel links with devices at different locations in the environment. A memory can have stored data that includes fingerprinting data. The fingerprinting data can include values indicative of SNR measurements of a set of beams emitted at different beam angles by the phased antenna array and measured at a set of locations in the environment. Wherein the stored values indicative of SNR measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams.

Control circuitry communicatively connected with the phased antenna array and the memory, configured to perform a beam training with a target device located in the environment to estimate SNR values for different beams transmitted over the different beam angles. During the beam training, the transmitter and receiver probe a certain number of beams transmitted with different beamforming angles. For example, during the beam training, the transmitter sends training sequence in each beam sequentially and the receiver steers sequentially in all tested beams and measures strength of the signal from each steered beam. The beam training yields a path between the transmitter and receiver over which they establish a communication link.

The control circuitry can select, in response to the beam training, at least one dominant angle for a beamforming communication with the target device. Wherein the selecting is based on the signal strength (such as RSSI or SNR or some other metric) measured for each probed beam such that the beam that delivers the strongest signal is used to closing the link between the two devices.

The control circuitry can estimate from the mapping stored in the memory, a location of the target device corresponding to the SNR values for different beams estimated during the beam training. Wherein the estimating is based on one of machine learning or deep learning methods, aimed to map measured SNR values to the unknown location and orientation of the device.

The control circuitry can also estimate from the mapping stored in the memory, a location of the target device corresponding to the RSSI and beam indices values corresponding to the established link during the beam training. Wherein the estimating is based on the disclosed probabilistic method, aimed to map measured RSSI and beam indices to the unknown location and orientation of the device. Wherein the control circuitry transmits the location of the target device using the phased antenna array via a beamforming transmission over the at least one dominant angle to communicate the location of the target device.

According to an embodiment of the present disclosure, a communication system for keyless entry applications uses using beamforming transmission in a millimeter wave spectrum in an environment, that includes an access point and a mobile access point mounted in or on a vehicle, where the access point and the mobile access point include a phased antenna array configured to perform beamforming to establish millimeter wave channel links between the access point and the mobile access point at different locations in the environment. The communication system includes a memory connected to the access point phased antenna array along with stored data, and a memory connected to the mobile access point phased antenna array along with stored data. The stored data include values indicative of signal to noise ratio (SNR) measurements of a set of beams emitted at different beam angles by the access point and the mobile access point phased antenna arrays and measured at a set of locations, that provide for a mapping between different combinations of SNR values of the set of beams and the set of locations. Such that a location from the set of locations is mapped to a unique combination of the SNR values of the set of beams. Control circuitry communicatively connected the access point and the mobile access point phased antenna arrays and the memories. The control circuitry configured to perform a beam training with a target device associated with at least one keyless entry application located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device associated with the at least one keyless entry application using the phased antenna array via a beamforming transmission over the at least one dominant angle.

According to another embodiment of the present disclosure, an electronic system for keyless entry applications using beamforming transmission in a millimeter wave spectrum is configured to communicate with devices in an environment, the devices includes at least one access point and a mobile access point mounted in or on a vehicle, such that the at least one access point and the mobile access point include a phased antenna array configured to perform beamforming to establish millimeter wave channel links between the at least one access point and the mobile access point at different locations in the environment, the electronic system including a memory connected to the antennas, having stored data. The stored data include values indicative of signal to noise ratio (SNR) measurements of a set of beams emitted at different beam angles by the antennas and measured at a set of locations, that provide for a mapping between different combinations of SNR values of the set of beams and the set of locations. Such that a location from the set of locations is mapped to a unique combination of the SNR values of the set of beams. Control circuitry connected with the antennas and the memory, is configured to perform a beam training with a target device associated with at least one keyless entry application located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device associated with the at least one keyless entry application using the antennas via a beamforming transmission over the at least one dominant angle.

Another embodiment of the present disclosure a method using a communication system associated with at least one keyless entry application having beamforming transmission in a millimeter wave spectrum in an environment that includes a phased antenna array configured to perform beamforming to establish millimeter wave channel links with devices at different locations in the environment. The method including performing a beam training with a target device associated with at least one keyless entry application located in an environment to estimate SNR measurement values for different beams transmitted over the different beam angles using control circuitry connected with the antennas. The control circuitry is configured for selecting, in response to the beam training, at least one dominant angle for a beamforming communication with the target device. Accessing a memory connected to the phased antenna array, the memory having stored data. The stored data include values indicative of SNR measurements of a set of beams emitted at different beam angles by the phased antenna array and measured at a set of locations in the environment. Wherein the stored values provide a mapping between different combinations of SNR values of the set of beams and the set of locations. Such that a location from the set of locations is mapped to a unique combination of the SNR values of the set of beams. Estimating from the mapping stored in the memory, a location of the target device corresponding to the SNR values for different beams estimated during the beam training. Transmitting the estimated location of the target device associated with the at least one keyless entry application using the phased antenna array via a beamforming transmission over the at least one dominant angle.

Another embodiment of the present disclosure includes a communication system for keyless entry applications uses using beamforming transmission in a millimeter wave spectrum in an environment that includes antennas configured to perform beamforming to establish millimeter wave channel links with devices at different locations in the environment. The communication system including a memory connected to the antennas, having stored fingerprinting data. The stored fingerprinting data include values indicative of link attributes associated with beam signal measurements with states of devices and states of environments. The states of the devices include types of user behavior associated with each device, locations and poses of each device in each environment. The states of the environments include locations of physical objects and types of behavior of ambient users in each environment. Control circuitry communicatively connected with the antennas and the memory, is configured to perform a beam training with a target device associated with at least one keyless entry application located in the environment to measure beam signal values and environmental responses for different beams transmitted over the different beam angles. Select, in response to the beam training, at least one dominant angle for a beamforming communication with the target device. Estimate from the stored fingerprinting data in the memory, a state of the target device, a state of the environment, or a combination of both states corresponding to the environmental responses for different beams estimated during the beam training. Transmit the estimated states of the target device associated with the at least one keyless entry application and environment using the antennas via a beamforming transmission over the at least one dominant angle to communicate the state of the target device, the state of the environment, or both states.

Another embodiment of the present disclosure a method using a communication system for keyless entry applications having beamforming transmission in a millimeter wave spectrum in an environment, that includes antennas configured to perform beamforming to establish millimeter wave channel links with devices at different locations in the environment. The method including performing a beam training with a target device associated with at least one keyless entry application located in an environment to measure beam signal values and environmental responses for different beams transmitted over the different beam angles using control circuitry connected with the antennas. The control circuitry is configured for selecting, in response to the beam training, at least one dominant angle for a beamforming communication with the target device. Accessing a memory connected to the antennas, the memory having stored fingerprinting data. The stored fingerprinting data include values indicative of link attributes associated with beam signal measurements with states of devices and states of environments. The states of the devices include types of user behavior associated with each device, locations and poses of each device in each environment. Wherein the states of the environments include locations of physical objects and types of behavior of ambient users in each environment. Estimating from the mapping stored fingerprinting data in the memory, a state of the target device, a state of the environment, or a combination of both states corresponding to the environmental responses for different beams estimated during the beam training. Transmitting the estimated states of the target device associated with the at least one keyless entry application and environment using the antennas via a beamforming transmission over the at least one dominant angle to communicate the state of the target device, the state of the environment, or both states.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4I is a table illustrating beam attributes from 3 APs using B different beams at the first measurement time, according to some embodiments of the present disclosure;

FIG. 4J and FIG. 4K are table tables illustrating beam attributes from 3 APs using B different beams at two other measurement times out of all N measurements, according to some embodiments of the present disclosure;

FIG. 4L is a schematic of constructing a fingerprinting dataset by collecting beam attributes from 3 APs when the use is at another location, orientation, height, pose, etc. over a course of N repetitions, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

The present disclosure relates generally to communications systems, and more particularly to millimeter wave fingerprinting-based indoor localization with beam SNR measurements. In particular, the present disclosure discloses a low-cost fingerprint-based localization method, where in addition to the RSS measurements, also discloses fingerprint beam indices that two mm Wave devices select from a finite set of feasible beams during their beam alignment procedure.

Figure 1A:
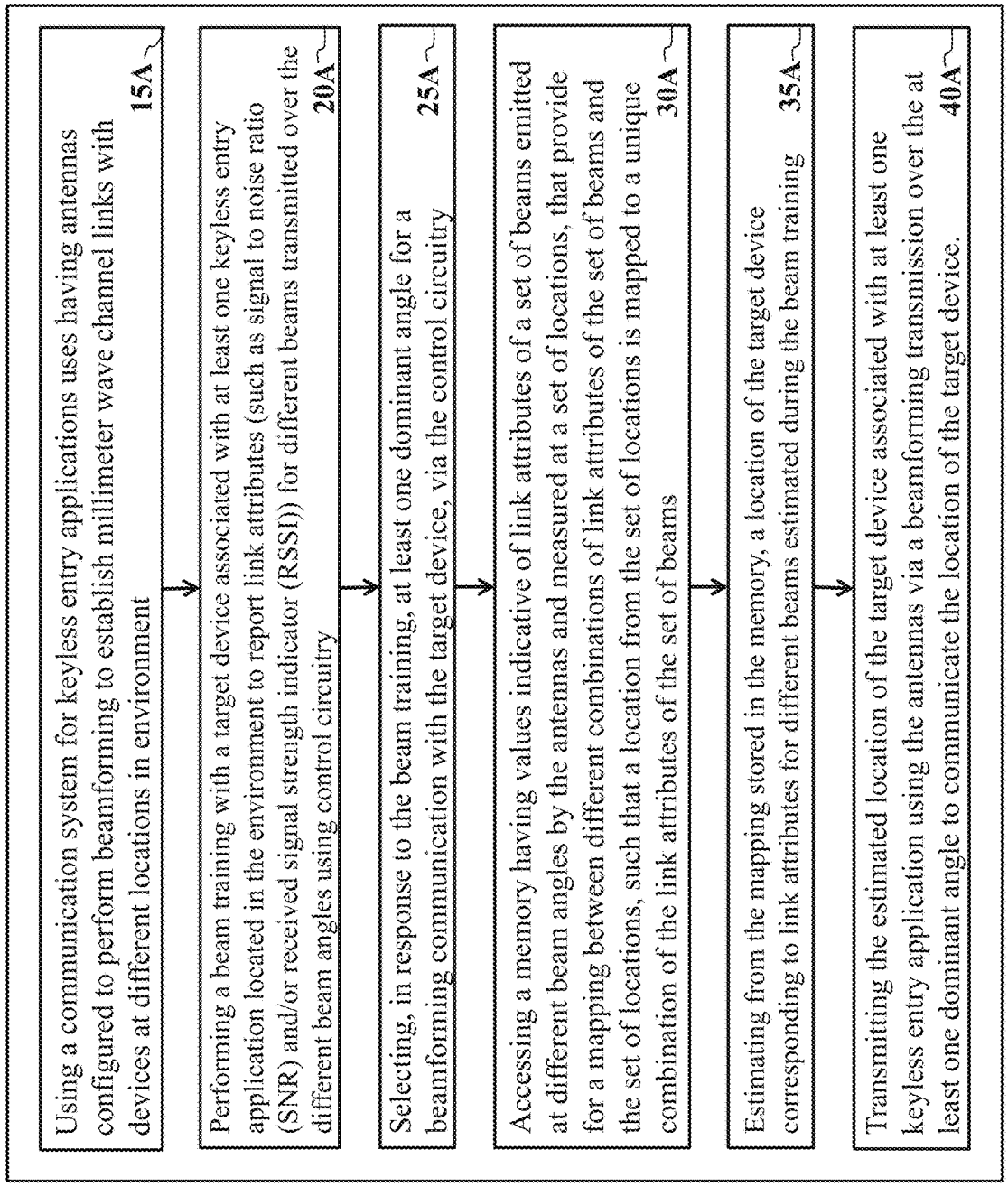
FIG. 1A is a block diagram illustrating a method, according to an embodiment of the present disclosure.

FIG. 1A is a block diagram of a method, according to an embodiment of the present disclosure.

Step 15A of FIG. 1A includes using a communication system for keyless entry applications having beamforming transmission in a millimeter wave spectrum in an environment, that includes an access point and a mobile access point mounted in or on a vehicle, where the access point and the mobile access point include a phased antenna array configured to perform beamforming to establish millimeter wave channel links between the access point and the mobile access point at different locations in the environment.

Step 20A of FIG. 1A includes performing a beam training with a target device located in an environment to report link attributes (such as signal to noise ratio (SNR) and/or received signal strength indicator (RSSI)) for different beams transmitted over different beam angles using control circuitry connected with the antennas.

Step 25A of FIG. 1A includes the control circuitry is configured for selecting, in response to the beam training, at least one dominant angle for a beamforming communication with the target device.

Step 30A of FIG. 1A includes accessing a memory connected to the phased antenna array, the memory having stored data that includes values indicative of link attributes of a set of beams emitted at different beam angles by the phased antenna array and measured at a set of locations in the environment, wherein the stored values provide a mapping between different combinations of link attributes of the set of beams and the set of locations, such that a location from the set of locations is mapped to a unique combination of the link attributes of the set of beams.

Step 35A of FIG. 1A includes estimating from the mapping stored in the memory, a location of the target device corresponding to link attributes for different beams estimated during the beam training.

Step 40A of FIG. 1A includes transmitting the location of the target device using the phased antenna array via a beamforming transmission over the at least one dominant angle to communicate the location of the target device.

Figure 1B:
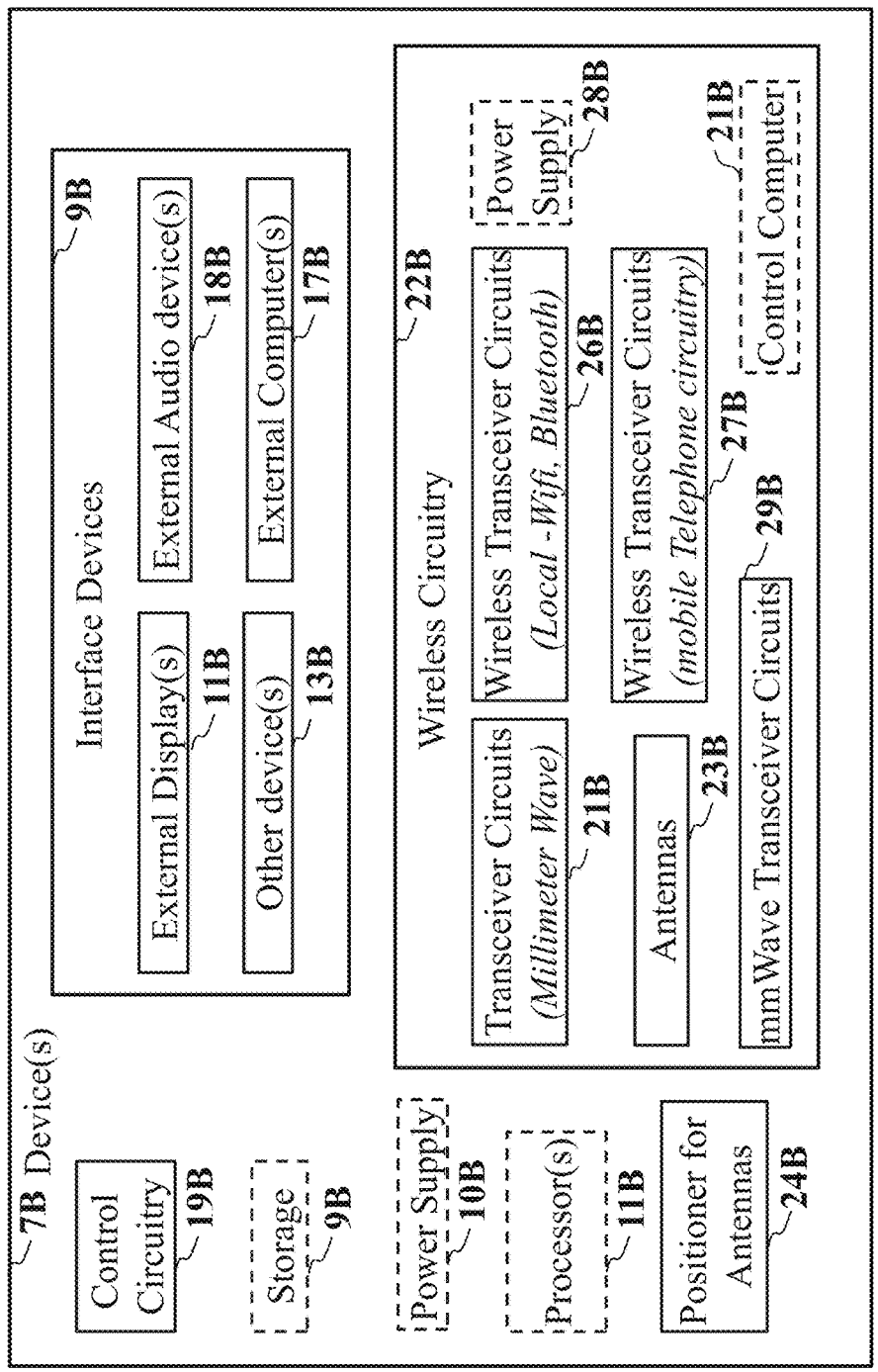
FIG. 1B is a schematic illustrating some components used for implementing the method of FIG. 1A, according to some embodiments of the present disclosure.

FIG. 1B is a schematic illustrating the device having some components with wireless communication circuitry used for implementing the methods of FIG. 1A, according to some embodiments of the present disclosure. The device 7B can include control circuitry 19B, that can include storage, i.e. flash memory, nonvolatile/volatile memory, hard disk drive storage, programmable-read-only memory, etc. The control circuitry 19B can be configure to utilize the processing circuitry to control the operation of device 7B, such as microcontrollers/processors, signal processors, etc.

Control circuitry 19B can be used to run software on the device 7B, where the control circuitry 19B can be configure to support communications with other equipment, such as implementing communication protocols, i.e. wireless local area network protocols (IEEE 802.11, IEEE 802.11ad, wireless telephone, etc. The device 7B can include interface devices 9B having circuitry to communicate data to be supplied to the device and/or allow data to be provided from the device 7B to external or other devices, i.e. external displays 11B, external audio devices 18B, other devices 13B, external computers 17B, or other like devices such as the device 7B, for example, 7C of FIG. 1C. Other components are contemplated that can be incorporated into the device 7B or sub-components of the device 7B, such as, one or a combination of Remote Access Device that can include application memory, controller, satellite positioning receiver, wireless communication circuitry, accelerometer, authentication device, and antennas. Further, the device can be in communication with an electronic lock system associated with a vehicle, the lock system can include deadbolt, application memory, controller, wireless communication circuitry, accelerometer, proximity detector, interior and exterior antennas, and authentication. The device 7B can also include a router plugin unit that can include a controller, radio, processor, computer, etc. that can communicate with the internet and cell network. Contemplated is that the device 7B can be fixed (see FIG. 3A, 305A, 305B, 305C), or a mobile device (see FIG. 3A, 309).

Optionally, the device 7B can include a non-transitory computer readable storage medium 9B embodied thereon a program executable by a processor for performing a method, i.e. a method that can include executing control policies, and the like. In addition, optionally the device 7B can include one or more processors 11B, depending upon the intended specific application. Further, optionally one or more power supply 10B can be provided either internally or externally, depending upon the specific application.

The device 7B can include wireless communications circuitry 22B for communicating wirelessly with other equipment. The wireless communications circuitry 22B may include transceiver circuitry 21B formed from one or more integrated circuits, power amplifier circuitry, low-noise input amplifiers (not shown), passive RF components (not shown) and one or more antennas 23B. Also, the wireless communications circuitry 22B can include wireless transceiver circuits 26B (local-Wi-Fi, Bluetooth, wireless local area network, configured for 2.4 GHz, 5 GHz bands for IEEE 802.11, etc.), and wireless transceiver circuits 27B including mobile telephone circuitry. Depending upon the user intended applications one or all of the above components can be included. Further, optionally one or more power supply 28B can be provided either internally or externally, depending upon the specific application. Also, optionally can be a control computer 21B if the specific application is in need of one.

Still referring to FIG. 1B, the wireless communications circuitry 22B may include mmWave transceiver circuitry 29B that supports communications at frequencies of 7 GHz to 300 GHz or other mmWave frequencies. For example, the mmWave transceiver circuitry 29B may support IEEE 802.11ad communications at 28 GHz or 60 GHz, and may be configure from an integrated circuit(s).

Figure 3A:
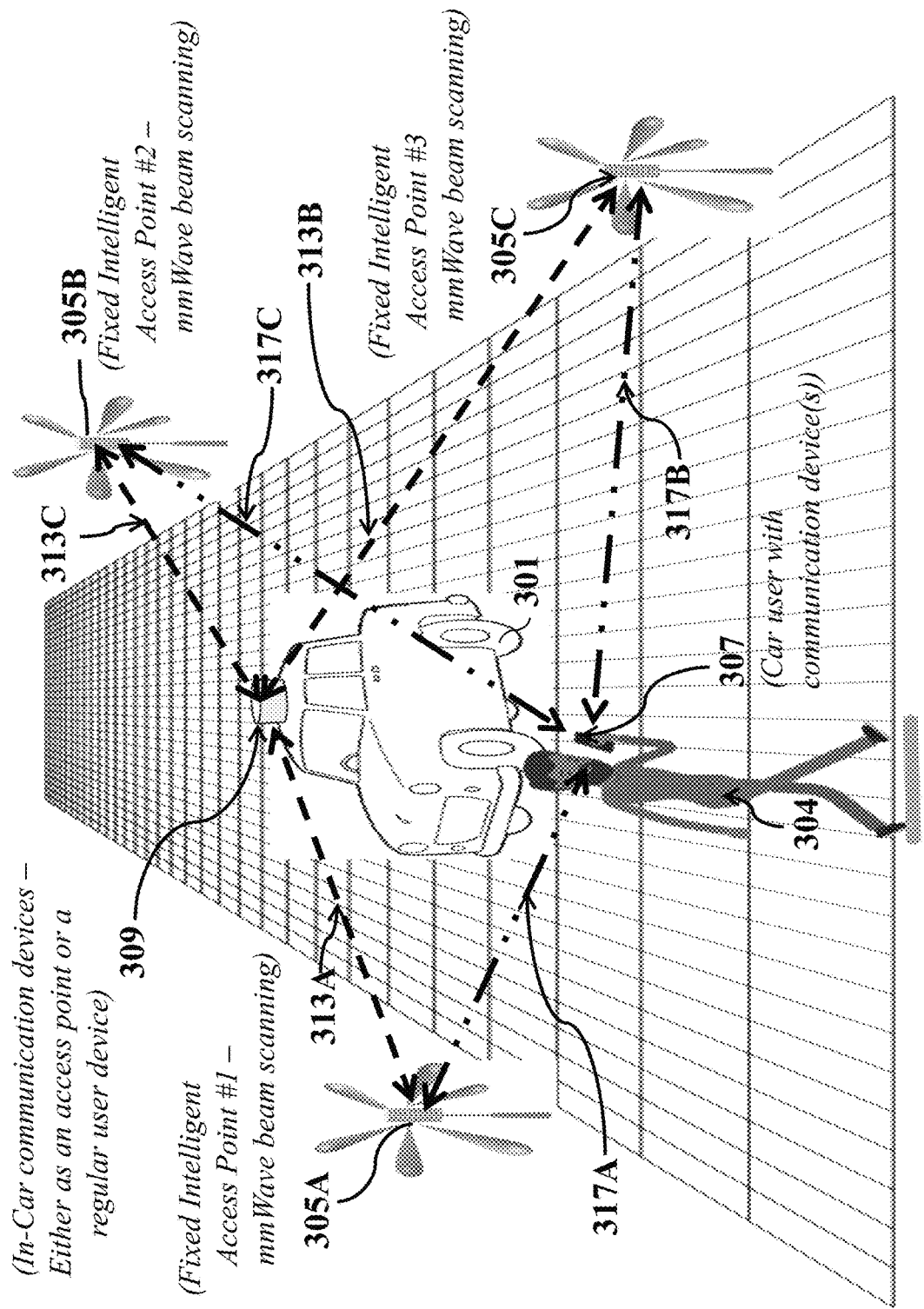
FIG. 3A is a schematic illustrating where three access points AP1, AP2 and AP 3 provide mm Wave communication coverage in outdoor environments, the outdoor environment can have a vehicle equipped with a in-vehicle mobile communication device that establishes a link to at least one access point and/or to a user with a mobile communication device, or another in-vehicle device with an access point having mm Wave beam scanning capabilities or a regular user device according to some embodiments of the present disclosure.
Figure 3B:
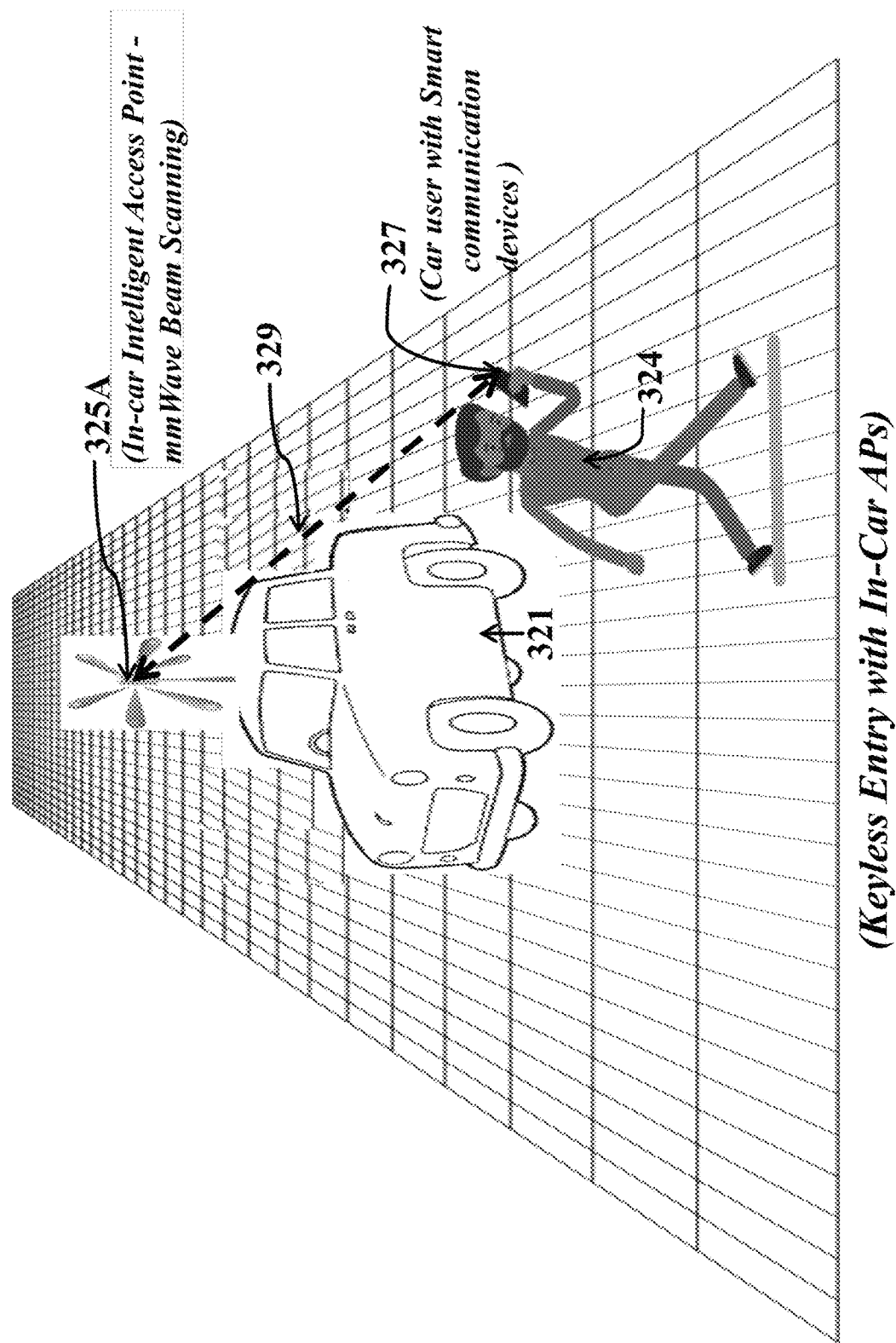
FIG. 3B is a schematic illustrating where an access point can provide mm Wave communication coverage in an indoor environment, the indoor environment includes a vehicle equipped with an access point that is a mobile in-vehicle intelligent mobile access point having mm Wave beam scanning capabilities, and a user equipped with an mobile communication device, according to some embodiments of the present disclosure.
Figures 3C, 3D:
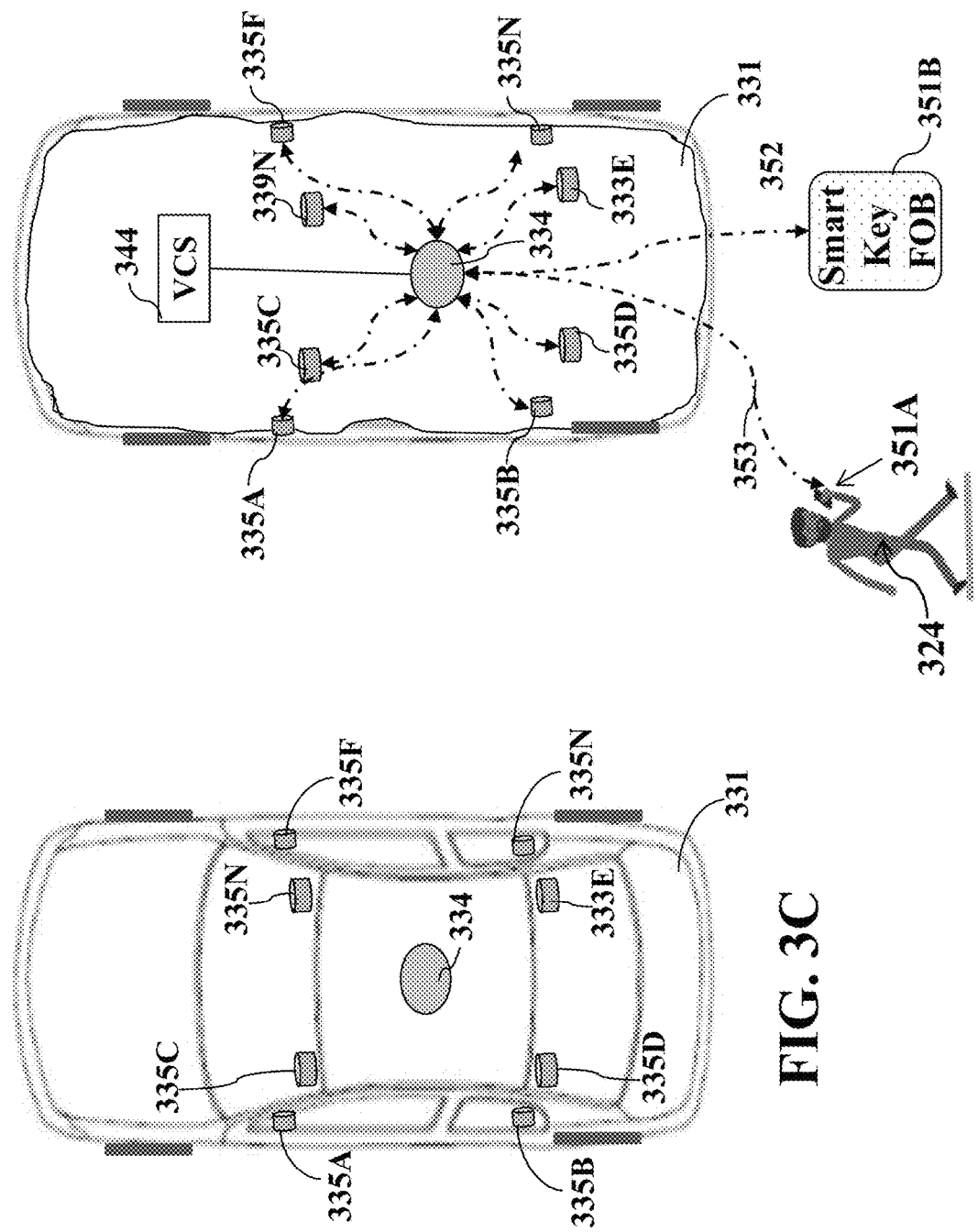
FIG. 3C and FIG. 3D are schematics illustrating a wireless car communication network for a car, such that the network can include a mobile access point device and/or a smart key FOG associated with a user that can be in communication with a vehicle control system (VCS) via the in-vehicle intelligent mobile communication access point, according to some embodiments of the present disclosure.

Antennas 23B can include the wireless communications circuitry 22B that can configure for use with multiple different types of antennas (see also FIG. 3B and FIG. 3C). For example, the different types of antennas can be used for different bands and combinations of bands. One type of antenna may be used in forming a local wireless link antenna and another type of antenna may be used in forming a remote wireless link antenna. Antennas 23B can include phased antenna arrays for handling millimeter wave communications. In addition, the antenna signals can be routed via transmission line paths within device 7B, wherein the transmission line paths may be used to couple antenna structures 23B to transceiver circuitry. The device 7B can include multiple antennas 23B, such that the antennas may be used together or one of the antennas may be switched into use while other antenna(s) are switched out of use. For example, the control circuitry 19B can be used to select an ideal antenna to use in device 7B in real time and/or to select an ideal setting for adjustable wireless circuitry associated with one or more of antenna 23B. Antenna adjustments may be made to tune antennas to perform in desired frequency ranges, to perform beam steering with a phased antenna array, and to otherwise optimize antenna performance. Sensors may be incorporated into antennas 23B to gather sensor data in real time that is used in adjusting antennas 23B.

Still referring to FIG. 1B, the antennas 23B can include phased antenna arrays to implement beam steering functions, wherein the antennas used in handling mmWave signals for frequency mmWave transceiver circuits 29B may be implemented as phased antenna arrays. The radiating elements in a phased antenna array 23B for supporting millimeter wave communications may be patch antennas, dipole antennas, or other suitable antenna elements. The mmWave transceiver circuitry 29B can be integrated with the phased antenna arrays 23B to form integrated phased antenna array and transceiver circuit modules or packages.

Objects in the environment can block wireless signals such as mmWave signals, such that mmWave communications usually require a line of sight between antennas 23B and the antennas on an external device. Accordingly, the device 7B can have multiple phased antenna arrays, each of which can be placed in a different location within or on device 7B. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas 23B from one or more different locations in device 7B are operated together may also be used (e.g., to form a phased antenna array, etc.).

Still referring to FIG. 1B, to further improve mmWave communications, the device 7B may include positioners 24B that can include mechanically moveable (adjustable) structures that are controlled to mechanically adjust the position of antennas 23B with respect to device 7B and/or the external device (e.g., to maintain line of sight with the external device).

Control circuitry 19B can provide control signals to the positioners 24B to mechanically adjust the position or orientation of the antennas 23B by an actuating motion of the positioners 24B via electrical control signals that actuate a change in an orientation or position of antennas 23B. For example, the positioners 24B can adjust the orientation or position of one of antenna 23B, or multiple antennas at different times.

Figure 1C:
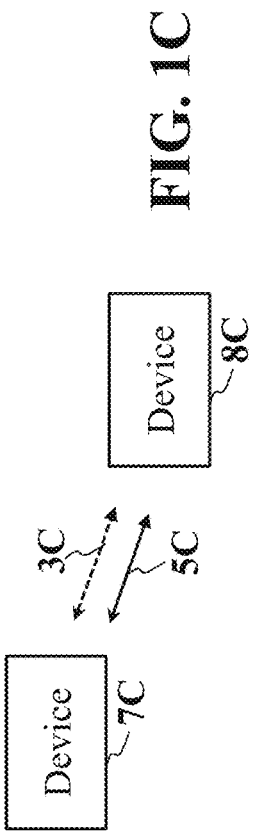
FIG. 1C is a schematic illustrating wireless communication between two devices that can communicate with channel links, according to some embodiments of the present disclosure.

FIG. 1C is a schematic illustrating wireless communication between two devices that can communicate with channel links, according to some embodiments of the present disclosure. Device 7C and device 8C can be the same or similar to the device 7B of FIG. 1B, depending upon the specific intended application.

For example, device 7C and device 8C can include antennas, each having a phase antenna array, such that both phase antenna arrays are designed for link establishment for mmWave communications and networks, for fingerprinting-based localization. Specific applications can include indoor localization of static and moving objects including people, robots, vehicles and drones, outdoor localization, tracking of static and moving objects. Both devices 7C, 8C are designed for use of commercially available beam SNR measurements, which is different from other measurement modalities used by conventional fingerprinting-based localization approaches. For example, some existing mmWave fingerprinting-based localization approaches use either CSI) which requires expensive prototyping mmWave platforms or RSSI that are coarse measurements with little information on spatial propagation paths.

The mmWave communications can include signals above 7 GHz, including 28 GHz, 60 GHz or other frequencies between about 7 GHz and 300 GHz. The devices 7C, 8C can include wireless communications circuitry for local wireless area network signals, near-field communications, cellular telephone signals, light-based wireless communications, satellite navigation system signals or other wireless communications. For example, the devices 7C, 8C can be wireless electronic devices, computers, laptops, or any type of device capable of being associated with communication circuitry that uses beam SNR designed for link establishment for mmWave communications and networks, for fingerprinting-based localization. Other examples can include devices designed for use by humans, either embedded into the human or carried or attached to the human. Further, the devices 7C, 8C can be associated with a fixed communication device for at a fixed location, or a mobile communication device for a vehicle. For example, the devices 7C, 8C can include a wireless AP or a base station such as a wireless router or other device for routing communications between other wireless devices and a larger network such as the internet or a cellular telephone network.

The devices 7C, 8C include wireless circuitry to perform mmWave communications over a wireless mmWave link such as mmWave link 3C, 5C. The mmWave link 5C may be a bidirectional link or unidirectional link, that data is communicated from electronic device 7C to device 8C or vice a versa, at one or more mmWave frequencies. Further, devices 7C, 8C can perform wireless communications with other equipment over a non-mmWave link. Wireless link 3C can be a wireless local area network (WLAN) link i.e. a Wi-Fi link or a wireless personal area network (WPAN) link such as a Bluetooth link.

Figures 2A, 2B:
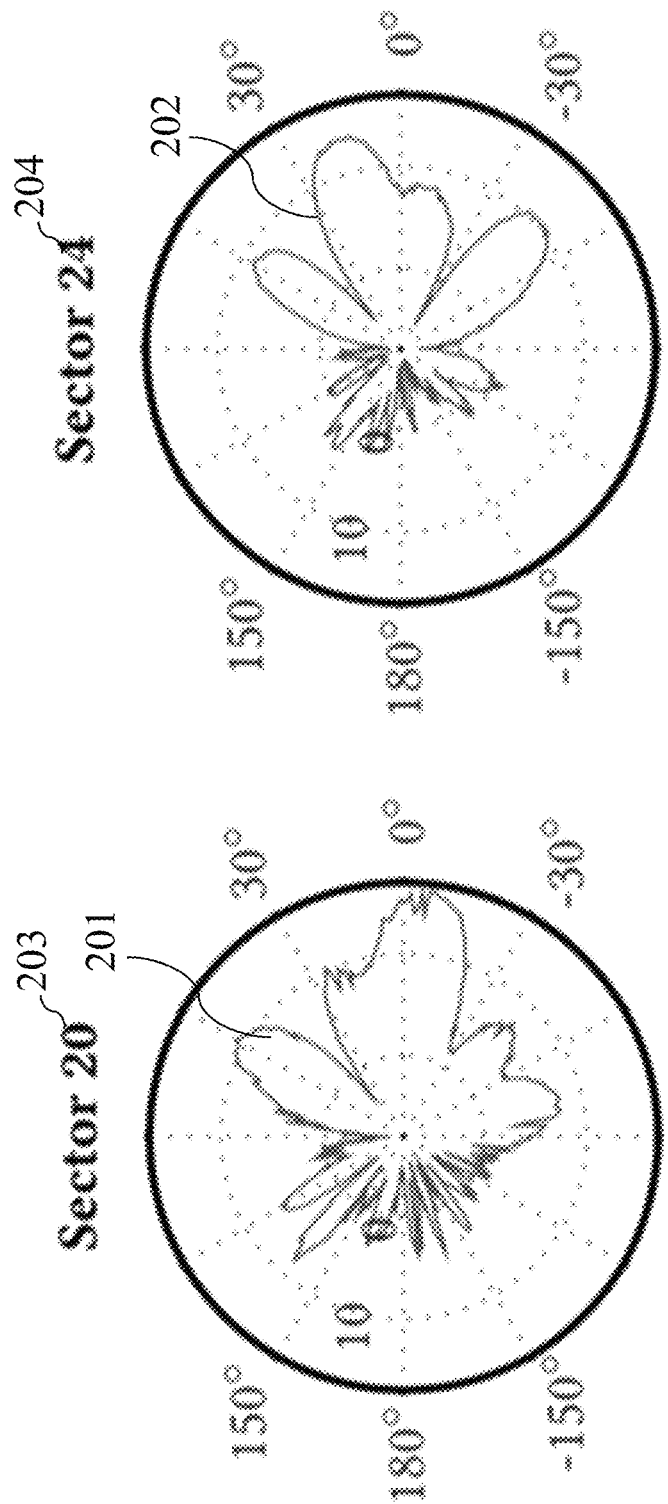
FIG. 2A and FIG. 2B illustrate shows magnitudes 201, 202 of two transmit beams 203, 204, labeled with beam indices 20 and 24 and experimentally measured in an anechoic chamber, according to some embodiments of the present disclosure.

FIG. 2A and FIG. 2B illustrate shows magnitudes 201, 202 of two transmit beams 203, 204, labeled with beam indices 20 and 24 and experimentally measured in an anechoic chamber, according to some embodiments of the present disclosure.

As an overview, the indoor localization method is based on a fully opportunistic use of commercial off-the-shelf (COTS) mmWave Wi-Fi routers. In particular, the proposed method leverages information about mmWave links established between a client and one or more APs that could be extracted from commercial transceiver chipsets. Towards that end, we utilize TP-Link Talon AD7200 router, which is one of the first and most popular Wi-Fi 60 GHz devices complying with the IEEE 802.11ad standard. The TP link router implements Qualcomm QCA9500 transceiver that supports a single stream communication in 60 GHz range using analog beamforming over 32-element planar array. The TP-Link's transceiver receives in quasi-omnidirectional configuration and transmits by steering signal into one of 34 possible beams, realized using pre-stored beamforming weights. Notably, the resulting beams depart from the theoretical ones and exhibit irregular shapes due to hardware imperfections at 60 GHz.

For example, FIG. 2A and FIG. 2B illustrate magnitudes 201, 202 of two transmit beams 203, 204, labeled with beam indices 20 and 24 and experimentally measured in an anechoic chamber. Two TP-Link devices establish mmWave communication link during beam alignment stage whereby one device is in the reception mode, i.e., implements quasi omni-directional beam, and measures the received signal levels of pilots sequentially transmitted over different beams by the other device. Upon this procedure, the two devices swap the roles the repeat the process. The beam alignment procedure yields beam indices to be used during data transmission, along with the RSS level measured over such a link. Following, we extract the recorded RSS and pair of transmit beam indices resulting from the TP-Link's beam alignment procedure and use that information for indoor localization. We emphasize that the developed algorithm can be generalized for the cases when mmWave transceivers employ different beam alignment procedures, for example when quasi-directional receive beams are also employed in addition to transmit beams.

Fingerprinting Stage

FIG. 3A is a schematic illustrating where three access points AP1, AP2 and AP 3 can provide mmWave communication coverage in indoor and outdoor environments which can have a vehicle equipped with a mobile in-vehicle communication device that can establish links to at least one AP according to some embodiments of the present disclosure. The access points (i.e. AP1, 305A; AP2, 305B; and AP3, 305C), can be the same device as the device 7B of FIG. 1B, or a similar like device, depending on the intended purpose of the specific application. The access points (i.e. AP1, 305A; AP2, 305B; and AP3, 305C), can be fixed at a fixed location.

The mobile in-vehicle communication device 301 can be the same as the device 7A of FIG. 1B, or a similar like device, depending on the intended purpose of the specific application.

Figure 10A:
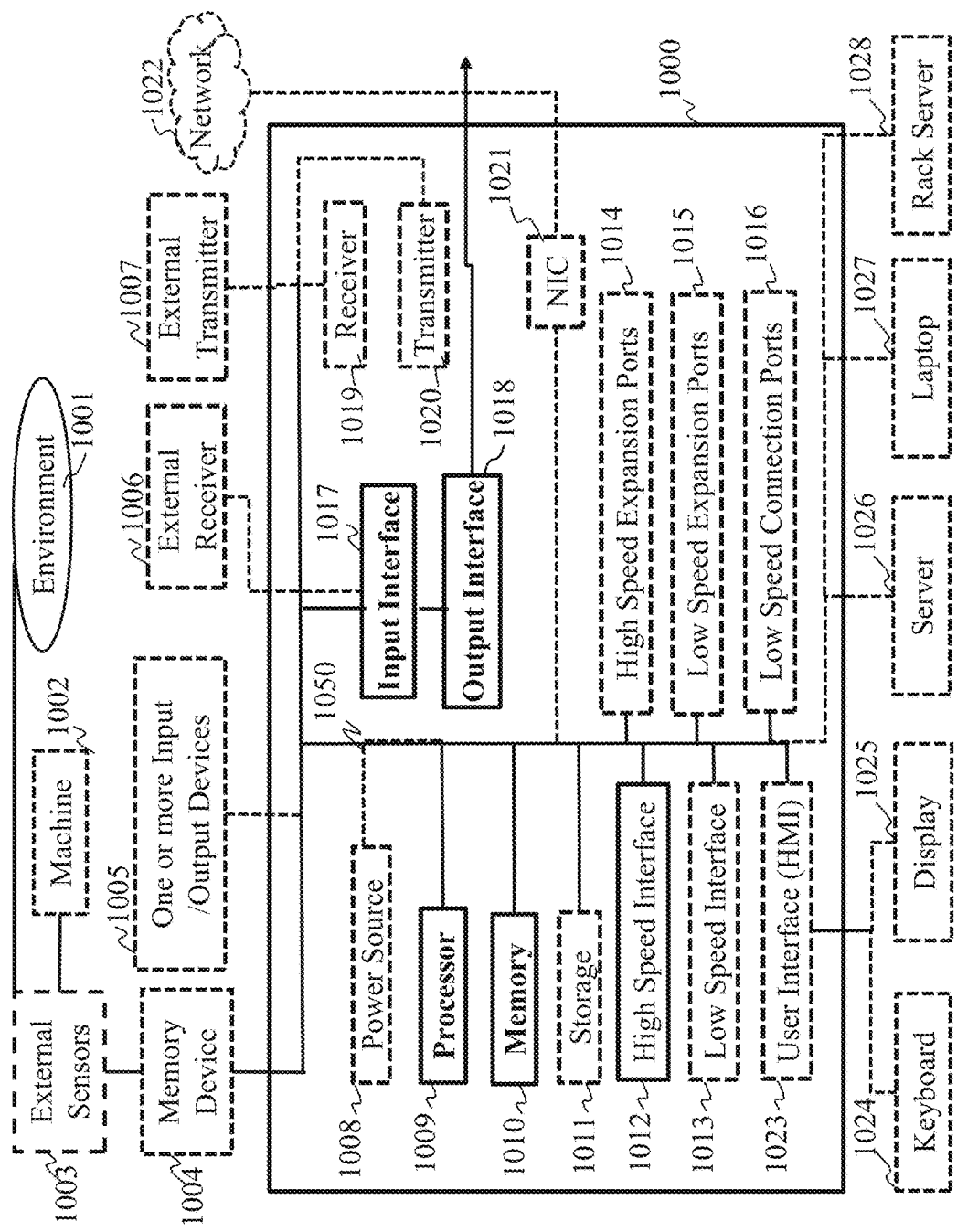
FIG. 10A is a schematic illustrating a computing apparatus that can be used to implement some techniques of the methods and systems, according to embodiments of the present disclosure.
Figure 10B:
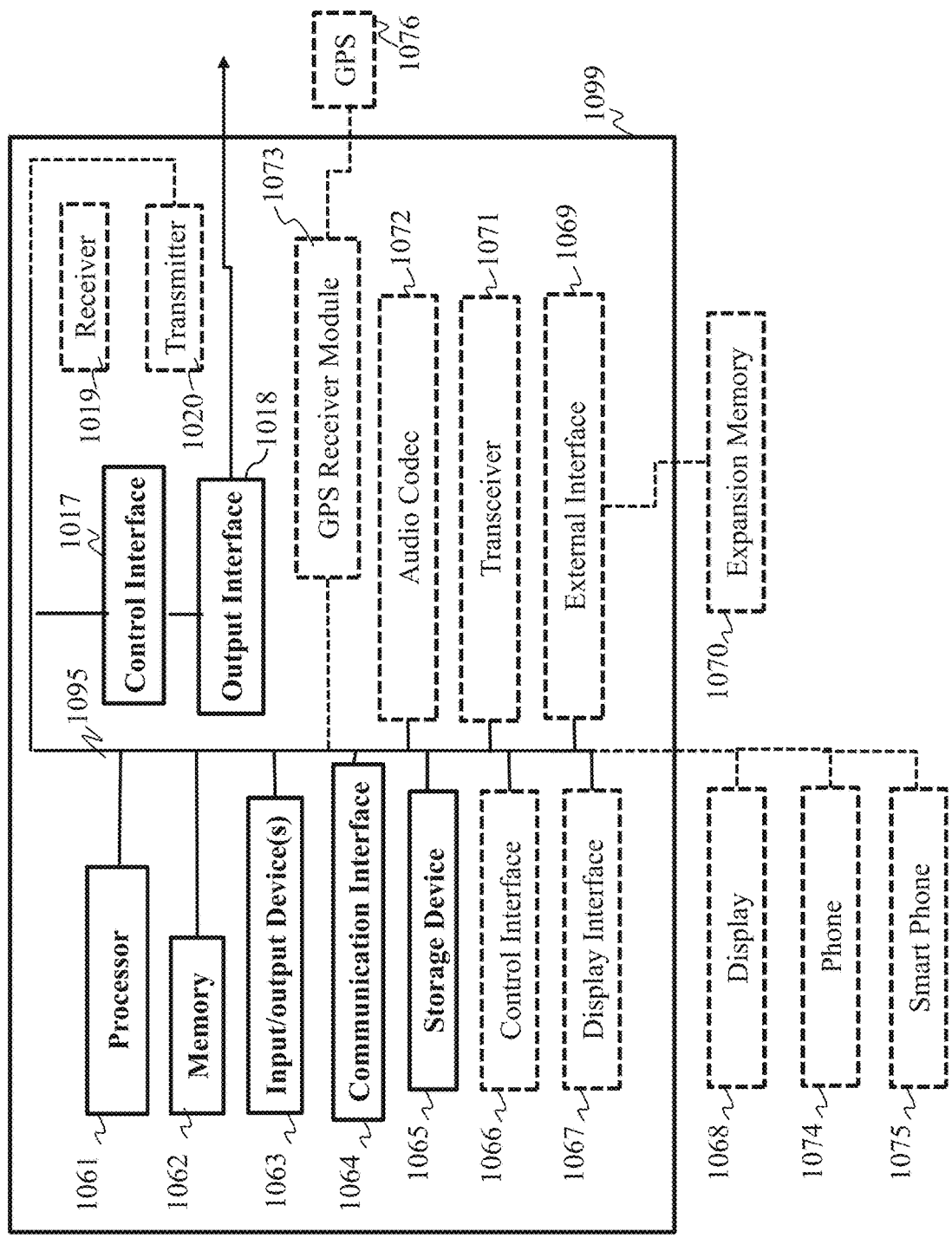
FIG. 10B is a schematic illustrating a mobile computing apparatus that can be used to implement some techniques of the methods and systems, according to embodiments of the present disclosure.

The mobile in-vehicle communication device 301 can also be the same as the device 7B of FIG. 1B, or a similar like device, depending on the intended purpose of the specific application. Contemplated is that the device 7B, the AP1, 305A; AP2, 305B; and AP3, 305C devices and the mobile in-vehicle intelligent access point 301, can include one or a combination of components as illustrated in FIG. 10A and FIG. 10B.

Still referring to FIG. 3A, at least some application scenarios may include having multiple access points (i.e. AP1, 305A; AP2, 305B; and AP3, 305C) positioned in location such as parking lots, private parking garage, street parking lots, etc. Although there are three access points illustrated in FIG. 3A, there can be at least one AP having mmWave beam scanning that can measure signal attributes (RSSI, SNR, beam indices, CSI etc.) for each scanned beam to users (including in-car devices 309 or personal users 307).

As we have previously elaborated, the devices probe different beam pairs during the beam alignment stage of the mmWave protocol, and the pair of beams over which the training signal is received with the best link quality is the one used for information exchange. During the fingerprint stage, measurements of N such beam pairs, along with the corresponding beam attributes, are recorded by forcing the devices to perform beam alignment N times. Due to dynamics in the environment, the most prominent one being movement of people, the mmWave link measurements are not time-invariant. On the other hand, due to the directivity of mmWave channel, it is unlikely to observe N significantly different recordings of beam pairs. In particular, our measurements in an office space environment with a usual people traffic during regular business hours indicate that only several different beam pairs ($b^{(AP)}, b^{(C)}$) emerge over N~1000 measurements.

FIG. 3B is a schematic illustrating where an access point can provide mmWave communication coverage in indoor and outdoor environment, the indoor environment includes a vehicle equipped with that access point that is a mobile in-vehicle intelligent access point having mmWave beam scanning capabilities, according to some embodiments of the present disclosure.

Still referring to FIG. 3A, in regard to the Localization of vehicles (using the beam attribute fingerprinting-based localization of the present disclosure), vehicles 301 can have at least one in-car device 309 (w/o mmWave beam scanning) to communicate with at least one access point of the three access points (i.e. AP1, 305A; AP2, 305B; and AP3, 305C) illustrated in FIG. 3A. For example, these 3 access points (i.e. AP1, 305A; AP2, 305B; and AP3, 305C) can collect beam attributes from the in-car device 309. Then, these 3 access points use the training data to determine the location and orientation (or height) of the vehicle 304.

In regard to the localization of authorized car users 304 (using the beam attribute fingerprinting-based localization of the present disclosure), the authorized car users 304 having at least one in-car device 309 (w/o mmWave beam scanning) can communicate with at least one access point of the three access points (i.e. AP1, 305A; AP2, 305B; and AP3, 305C) illustrated in FIG. 3A. These 3 access points can collect beam attributes from the devices 307 of authorized car users 304. Then, these 3 access points use the training data to determine the location and orientation (or height) of the car user 307.

Still referring to FIG. 3A, about the use of location information, the three access points (i.e. AP1, 305A; AP2, 305B; and AP3, 305C) can share the location/orientation/pose of authorized car users 307 to the car 301 for further operations. The three access points can also share vehicle's 304 location to authorized car user 307 to find the vehicle 304 in a parking lot.

In regard to authentication/Security, according to the present disclosure, the systems and methods can be used to assist with aspects associated with authentication/security, depending upon the specific application and intended purpose.

FIG. 3B is a schematic illustrating where an access point can provide mmWave communication coverage in indoor and outdoor environments, the environment includes a vehicle equipped with that access point that is a mobile in-vehicle intelligent access point having mmWave beam scanning capabilities, according to some embodiments of the present disclosure. The in-car devices probe different beam pairs during the beam alignment stage of the mmWave protocol, and the pair of beams over which the training signal is received with the best link quality is the one used for information exchange. Given the fingerprinting training dataset and trained localization modules (probabilistic method, machine learning and deep learning modules), the in-car device can use the beam attributes to localize the car users.

FIG. 3C and FIG. 3D are schematics illustrating a wireless car communication network for a car 331, such that the network can include a mobile access point device 334 that can be in communication with a vehicle control system (VCS) 344, according to some embodiments of the present disclosure. The mobile access point device 334 can communicate with a smart phone 351A and a smart key FOB 351B associated with a user 324. Wherein the mobile access point device 334 can be a base transceiver/processor unit that is installed in or on the car/vehicle 331.

The mobile access point device 334 can be in wireless communication with multiple antennas 335A to 335N located on the sides, front and back of the car 331. The multiple antennas 335A to 335N can be strategically position to maximize connectively for the smart phone 351A and a smart key FOB 351B associated with a user 324. The mobile access point device 334 can implement the IEEE 802.15.4 protocols and standards along with other protocols associate with past or updated versions of the IEEE802. Noted is that the IEEE 802.15.4 standard offers a choice of transmission frequencies. For example, it offers 16 channels in the worldwide, unlicensed, band of 2405-2480 MHz at data rates of 250 kbps. The protocol can be also optimized for low duty-cycle applications (less than 0.1 percent), offers low power consumption (allowing battery life from months to years), supports multiple topologies (such as star, peer-to-peer, mesh and/or cluster topologies and/or the like), provides 64 bit addressing, and offers full hand-shaking for reliable data transfer. In addition, the preferred 802.15.4/

Zigbee communication protocol can includes collision handling and/or avoidance mechanisms, permitting a single carrier frequency or frequency band (which is established on initiation of vehicular wireless network) and a single modulation scheme to be employed amongst a variety of devices.

Still referring to FIG. 3C and FIG. 3D, thus, the mobile access point device 334 can be operable to establish and/or maintain a bidirectional data link 352 with the smart key FOB 351B, and smart phone 351A via bidirectional data link 353, utilizing the above mentioned communication protocol. Further, the mobile access point device 334 can be used to communicate with other wireless devices or subsystems in or associated with vehicle 331, utilizing the one or more communication protocols.

The mobile access point device 334 may also be utilized either as a gateway (utilizing a different communication protocols) or more preferably as a local coordinator (utilizing a particular protocol) within an extended wireless area network associated with fixed infrastructure. For instance, examples of an extended wireless area network can include a house, which may be associated with one or more controllers, such as a home security system and/or a garage door, or security gate system, with which the vehicle 331 may interact.

Still referring to FIG. 3C and FIG. 3D, the mobile access point device 334 provides location awareness by providing a location and/or distance between it and another wireless transceiver(s) that communicate with the mobile access point device 334. This is quite advantageous, enabling many functions to be controlled based on distance as an input parameter. For instance, the distance between the key fob 351B or smart phone 351A, and the vehicle 331 may control via sending an approval distance signal for the key FOB 351B or smart phone 351A to the vehicle 331, so as to allow the control system of the car to unlock the car doors.

Figure 4A:
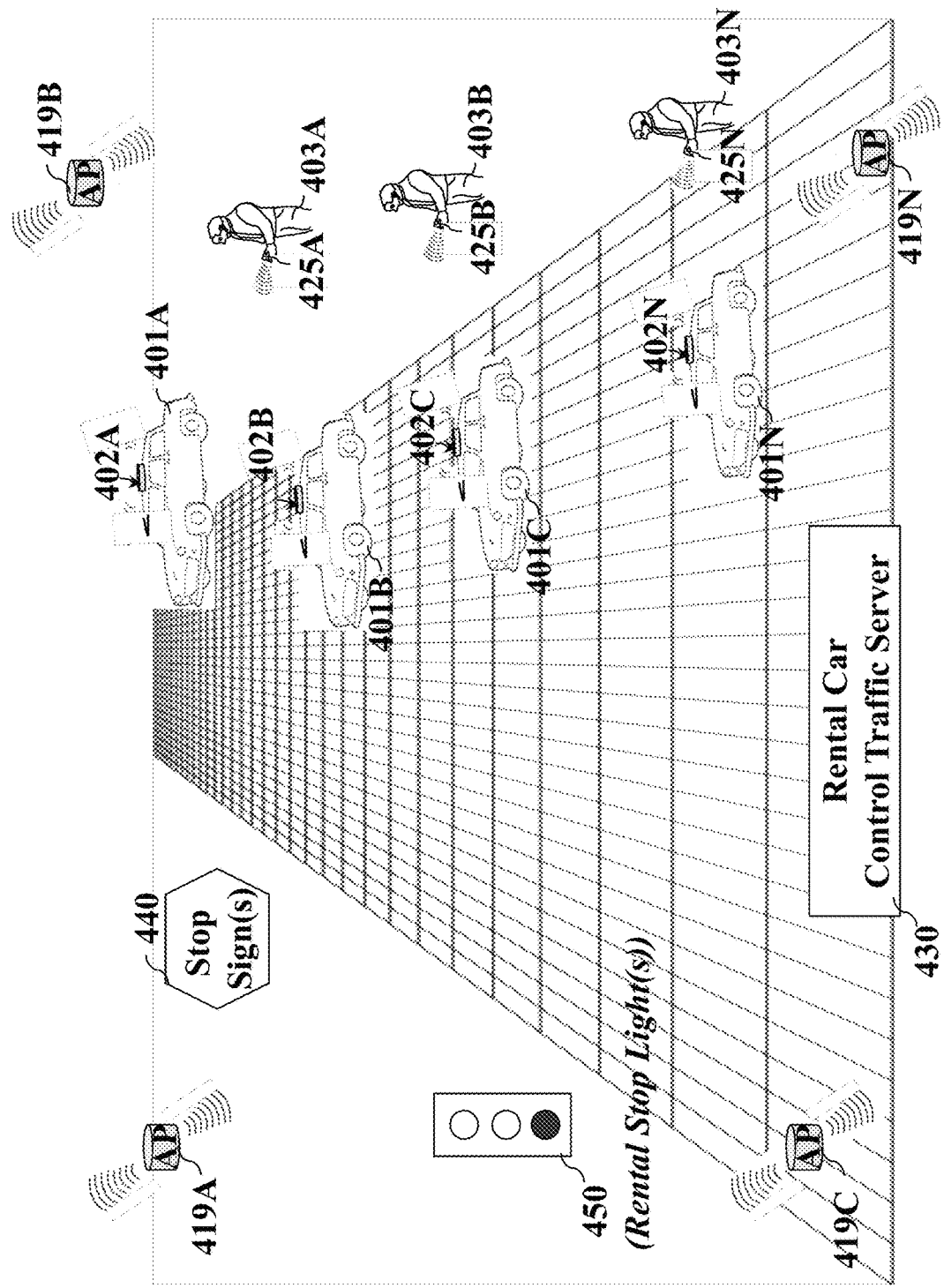
FIG. 4A is a schematic illustrating a rental car control network having communication between rental cars, fixed structures including stop signs and rental stop lights via antennas, and is configure for transmitting and receiving signals from mobile communication devices associated with rental car users, according to some embodiments of the present disclosure.

FIG. 4A is a schematic illustrating a rental car control network having communication between rental cars, fixed structures including stop signs and rental stop lights via antennas, and is configure for transmitting and receiving signals from mobile communication devices associated with rental car users. For example, the rental car control network can communication between rental cars 402A to 402N, fixed structures including stop signs 440 and rental stoplights 450 via antennas 419A to 419N on the rental premises, as well as can transmit and receive signals from mobile communication devices 403A to 403N associated with rental car users. The rental cars 402A to 402N may take driving commands based on the communication between the rental cars 402A to 402N and a rental car control traffic server 430. For example, a rental car server can be associated with an access point 402A to 402N mounted in each rental car along with control circuitry including a processor, memory, storage with software programs and a controller, to allow for communication with the rental car control traffic server 430, i.e. located either locally or remotely. The rental cars can be equipped with millimeter wavelength communication, Wi-Fi, WLAN, and cellular connectivity 402A to 402N. Wherein the access points 402A to 402N can be configured to sends signals alerting the rental car user of real time hazards within the rental premises, or an impending perceived rental car crash on the rental premises. Such that upon receiving the alert signals, i.e. voice commands alerting the rental car driver of the safety problem, the rental car driver can take corrective action to advert from the impending safety threat. In addition, the access points 402A to 402N can be configured to receive signals of information out the rental car driver's travel within the region or other helpful rental car user information. In addition, other information can include current driving conditions or upcoming weather conditions within the region, which can be conveyed via Wi-Fi or cellular to the rental car driver's mobile communication device, i.e. smart phone. Other devices on other observations including road conditions or traffic.

Figure 4B:
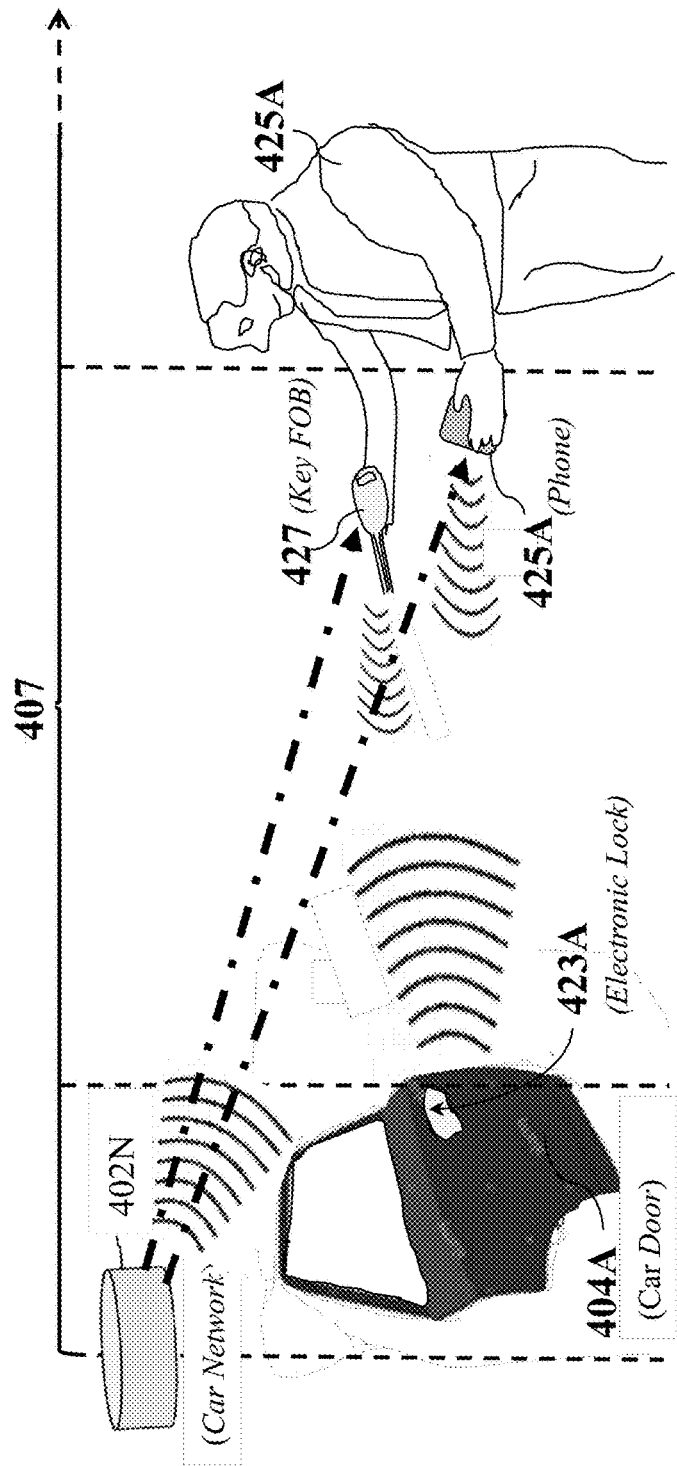
FIG. 4B is a schematic of a mobile access point car communication system communication between mobile communication device including a smart key FOB and smart phone.
Figure 4C:
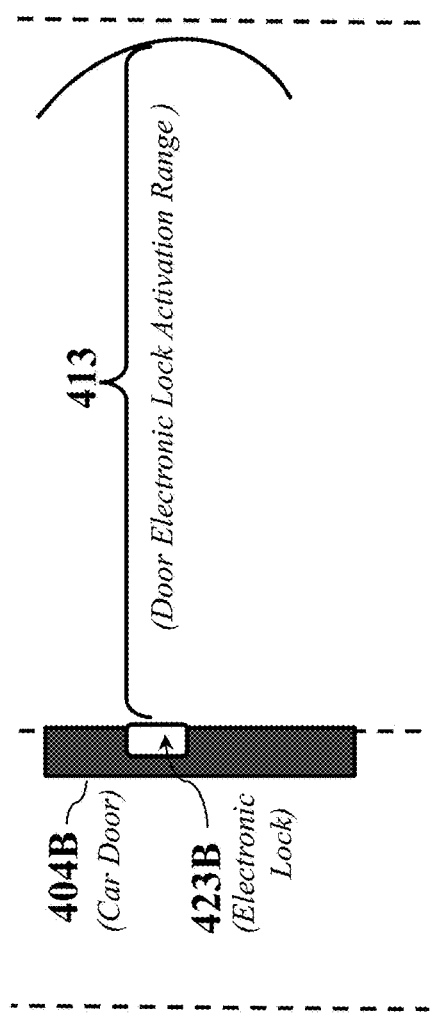
FIG. 4C is a schematic illustrating a range and location determination for the smart key FOB, according to some embodiments of the present disclosure.

FIG. 4B is a schematic of a mobile access point car communication system communication between mobile communication device including a smart key FOB and smart phone, and FIG. 4C is a schematic illustrating a range and location determination for the smart key FOB, according to some embodiments of the present disclosure.

FIGS. 4B and 4C show a user 425A with a remote access device, i.e. a smartphone 425A and a key FOB 427. Assuming the remote access device 425A, 427 is located within in-signal range, the location of the remote access device 425A, 427 can be determined, and upon verification within a predetermined distance to the vehicle, a signal can be sent to the control system of the car, that acknowledges for the wireless connection to be made between the remote access device 425A, 427 and an electronic lock 423, so the lock can open. The remote access device 425A, 427 is previously authorized to control the electronic lock 423.

For example, when the user 425A approaches, their location can be determined via the systems and methods of the present disclosure by mmWave communication. Once the user 425A location is determined and is within a predetermined activation range 413 of FIG. 4C, then a signal can be sent to the control system of the car, that acknowledges for the wireless connection to be made between the remote access device 425A, 427 and an electronic lock 423, so the lock can open. However, if no signal is sent to the control system of the car to acknowledge the wireless connection, then the lock will not open. While the wireless access system is described herein with respect to a car door, the wireless access system may be used for access control of, but not limited to, for example, appliances, a safe, heavy machinery, factory equipment, power tools, pad locks, real estate lockboxes, garage door openers, etc.

Figures 4E, 4F, 4G, 4H:
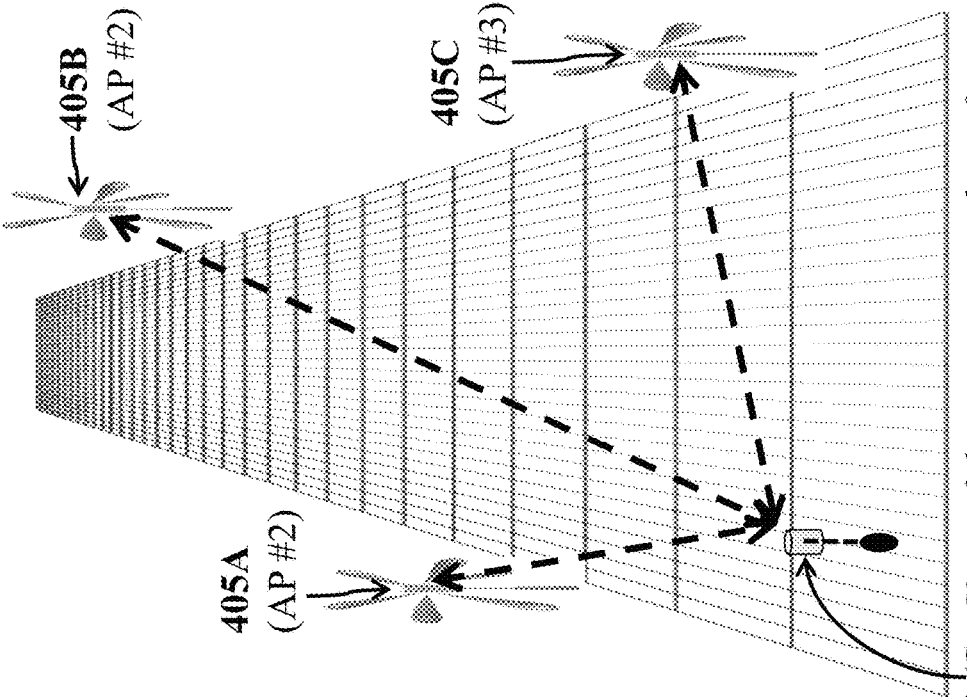
FIG. 4E is a table illustrating beam attributes from 3 APs using B different beams at the first measurement time, according to some embodiments of the present disclosure.
FIG. 4F and FIG. 4G are table tables illustrating beam attributes from 3 APs using B different beams at two other measurement times out of all N measurements, according to some embodiments of the present disclosure.
FIG. 4H is a schematic of constructing a fingerprinting dataset by collecting beam attributes from 3 APs when the use is at one location, orientation, height, pose, etc. over a course of N repetitions, according to some embodiments of the present disclosure.

FIG. 4H shows the fingerprinting step on each rectangular grid in the coverage area of the three APs 405A, 405B, 405C. During fingerprinting step, a communication device 489 with capabilities to establish communication links to at least one AP is placed at a location, orientation and height (or, possibly, with a person or robot holding the device). The collected beam attributes from three APs 405A, 405B, 405C using B different beams are registered as fingerprinting data at this location. The table in FIG. 4E shows the beam attributes from three APs 405A, 405B, 405C using B different beams at the first measurement time. The tables in FIG. 4F and FIG. 4G show beam attributes from three APs 405A, 405B, 405C using B different beams at two other measurement times out of all N measurements.

FIG. 4L shows the fingerprinting step is repeated at another location in the coverage area of the three APs 429A, 429B, 429C. During fingerprinting step, a communication device 490 with capabilities to establish communication links to at least one AP is placed at another location, orientation and height (or, possibly, with a person or robot holding the device). The collected beam attributes from three APs 429A, 429B, 429C using B different beams are registered as fingerprinting data at this location. The table of FIG. 4I shows the beam attributes from three APs 429A, 429B, 429C using B different beams at the first measurement time. The tables of FIG. 4J and FIG. 4K show beam attributes from three APs 429A, 429B, 429C using B different beams at two other measurement times out of all N measurements.

Figure 5A:
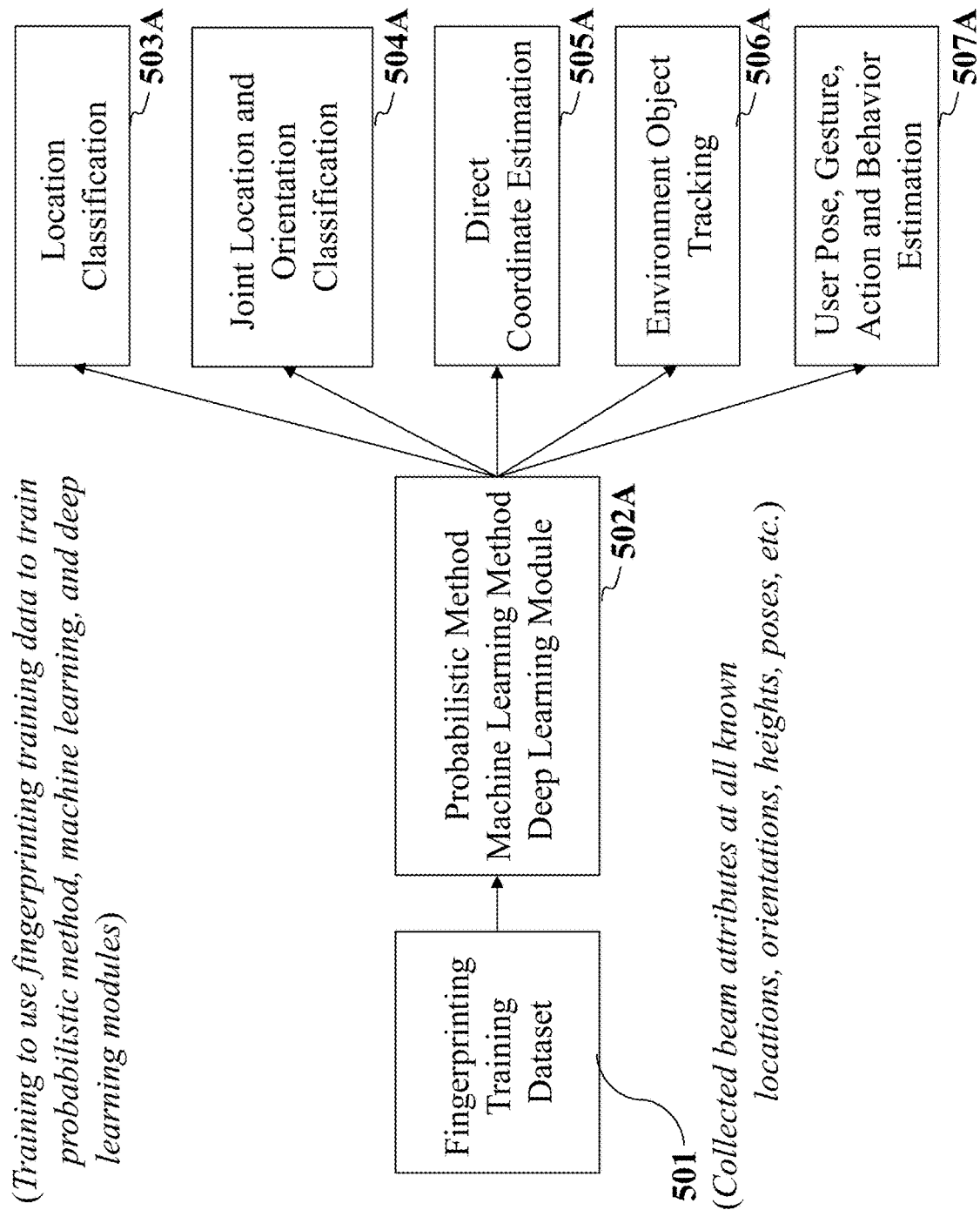
FIG. 5A is a schematic of using all collected beam attributes at all fingerprinting locations, orientations, heights, poses, etc. to train probabilistic method, machine learning, and deep learning modules, according to some embodiments of the present disclosure.

FIG. 5A is a block diagram of using the fingerprinting training dataset 501 to train various modules 502A such as probabilistic method, machine learning and deep learning modules for various purposes 503A, 504A, 505A, 506A, 507A which can be used for the keyless entrance application.

Figure 5B:
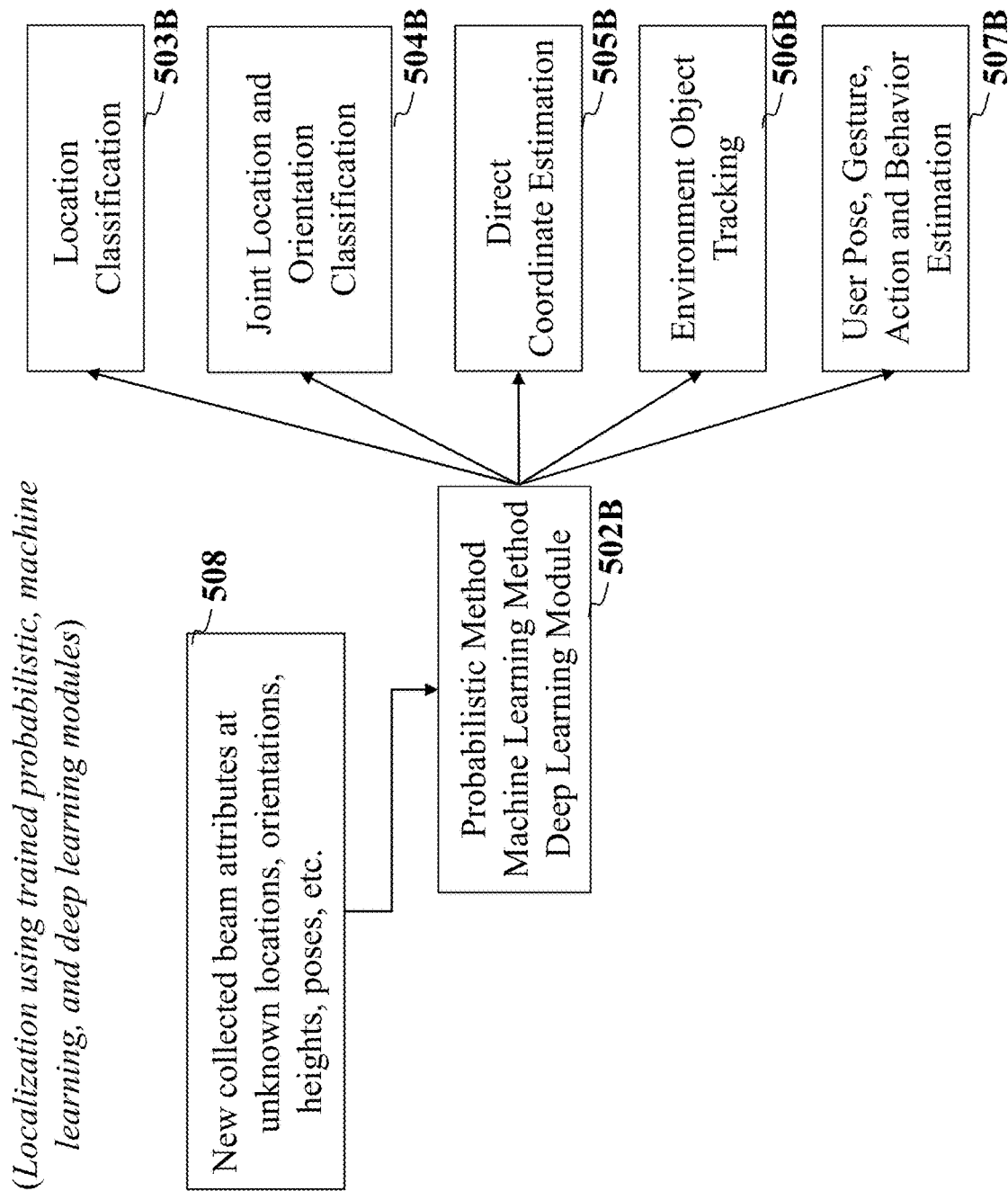
FIG. 5B is a schematic of applying the trained probabilistic method, machine learning, and deep learning modules to new collected beam attributes at unknown locations, orientations, heights, poses, etc. for the purpose of localization, according to some embodiments of the present disclosure.

FIG. 5B is a block diagram of applying trained various modules 502B to the new beam attributes 508 to estimate location, orientation, heights, poses, etc. 503B, 504B, 505B, 506B, 507B which can be used for the keyless entrance application.

Probabilistic Method

Figure 6:
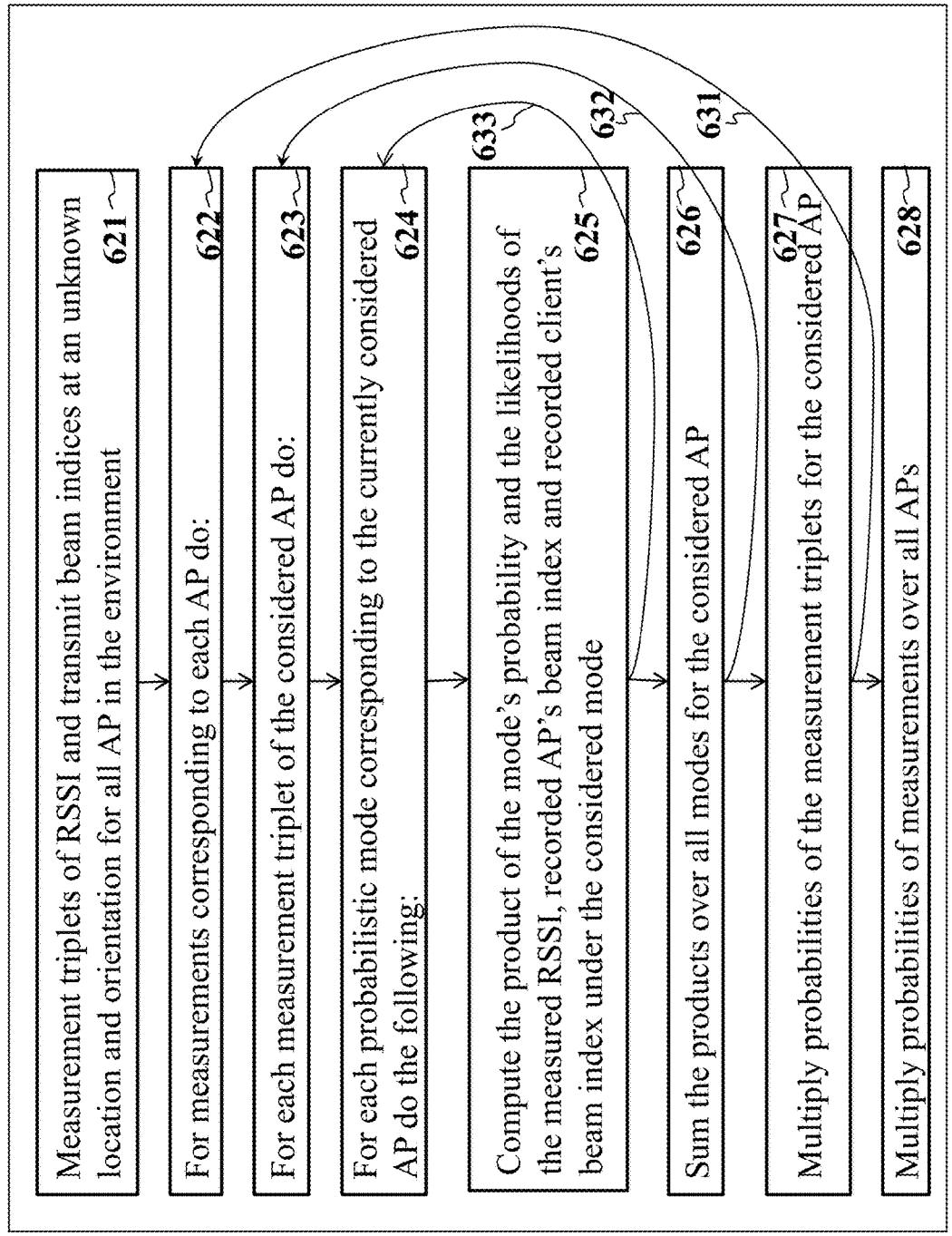
FIG. 6 is a schematic illustrating the probabilistic method when the beam attributes include the RSSI and transmit beam indices, according to some embodiments of the present disclosure.

FIG. 6 is a block diagram of illustrating a probabilistic method computing the likelihood of all measurements at a location-orientation pair (l, o), according to some embodiments of the present disclosure. The input 621 consists of I measurement triplets for each of K access points. The measurement triplet in this embodiment consists of the measured RSSI value and two beam indices, however, as previously elaborated, there could be more beam indices contained in one measurement instance. Given the input and hypothesized location, orientation pair, loops through measurements of all AP's 622 and then loops through the measured triplets of each considered AP 623. Then, to compute the likelihood of the considered measurement triplet, the method loops through all modes corresponding to the considered AP 624 and computes the likelihood of the measurement triplet under each mode. That is done by computing the product 625 of the mode probability, likelihood of the RSSI, likelihood of the recorded AP's beam index and likelihood of the AP's beam index, where the RSSI and beam indices are from the considered measured triplet. This product is essentially the term under the summation in (14). The mode probability is contained in the stored summary of the fingerprint measurements, the RSSI likelihood is obtained or the combination of (5) and (6), while the likelihood of beam index is computed either using (15) or (16). The likelihoods of the considered measurement triplets under all different modes are computed by looping 633 through all of modes corresponding to the considered AP and are then summed 626 to yield the likelihood of the considered measurement triplet. The method loops 632 through all measurement triplets corresponding to the considered AP, computes their probabilities and multiplies those together 627. Finally, the method loops 631 through all AP's, computes probability of the measurements corresponding to each AP present in the environment and multiplies them 628 to yield the final probability of all measurements at some location-orientation pair. We note that the sum in (14) loops through the modes 633, while the products in (13) loop through APs 631 and measurement triplets 632, respectively.

This likelihood of all measurements for some location-orientation pair is substituted into (12), together with possibly non-uniform prior p(l, o), to eventually yield (after normalization) the posterior distribution of location-orientation pairs. The client's location and orientation are detected based on its measurements M as the location-orientation pair with the largest posterior probability, $$\hat{l}, \hat{o} = \arg\max_{l,o} p(l, o \mid \mathcal{M}, \mathcal{S}), \quad \text{(Eq. 17)}$$

Machine Learning Module

For the machine learning and deep learning models, we use the beam SNR as the link attributes. For practical 60-GHz WI-FI devices such as commercial access points (APs), a fixed set of varying beam sectors are swept in a pre-defined time order. For instance, the first 60 GHz device that fully implements the IEEE 802.11ad standard, TP-Link Talon AD7200 router with a phased array of 32 antenna elements has 36 pre-defined beam sectors. Due to the antenna housing and calibration, irregular antenna beam patterns are used in the phase array. Two of such irregular antenna beam patterns are shown in FIGS. 2A and 2B. Given the antenna beam patterns, the beam SNR for the m-th beam pattern is defined as $$h_m = \text{Beam } SNR_m = \frac{\sum_{i=1}^{I} \gamma_m(\theta_i) P(\theta_i)}{\sigma^2}, \quad \text{(Eq. 1)}$$

where I is the total number of (LoS/NLoS) paths, $\theta_i$ is the azimuth angle for the i-th path, $P(\theta_i)$ is the signal power at the i-th path, $\gamma_m(\theta_i)$ is the m-th antenna beam pattern gain at the i-th path, and $\sigma^2$ is the noise variance.

To construct the fingerprinting dataset, we stack all SNR measurements from all beam sectors as a vector, e.g., $h=[h_1, h_2, \ldots, h_M]T$. When multiple APs are used, we combine beam SNR measurements from each AP to form one fingerprinting snapshot, i.e., $\tilde{h}=[h_1^T, h_2^T, \ldots, h_P^T] \in \mathbb{R}^{MP \times 1}$, where P is the number of APs. For a given location and orientation, R fingerprinting snapshots, $\tilde{h}_1(l,o), \ldots, \tilde{h}_R(l,o)$, are collected to construct the offline training dataset, where l and o are the indices for the location and orientation, respectively.

By collecting many realizations of beam SNR measurements at multiple APs over L locations-of-interests and O orientations, we will have LO sets of MP×R beam SNR measurements in the training dataset.

Figure 7:
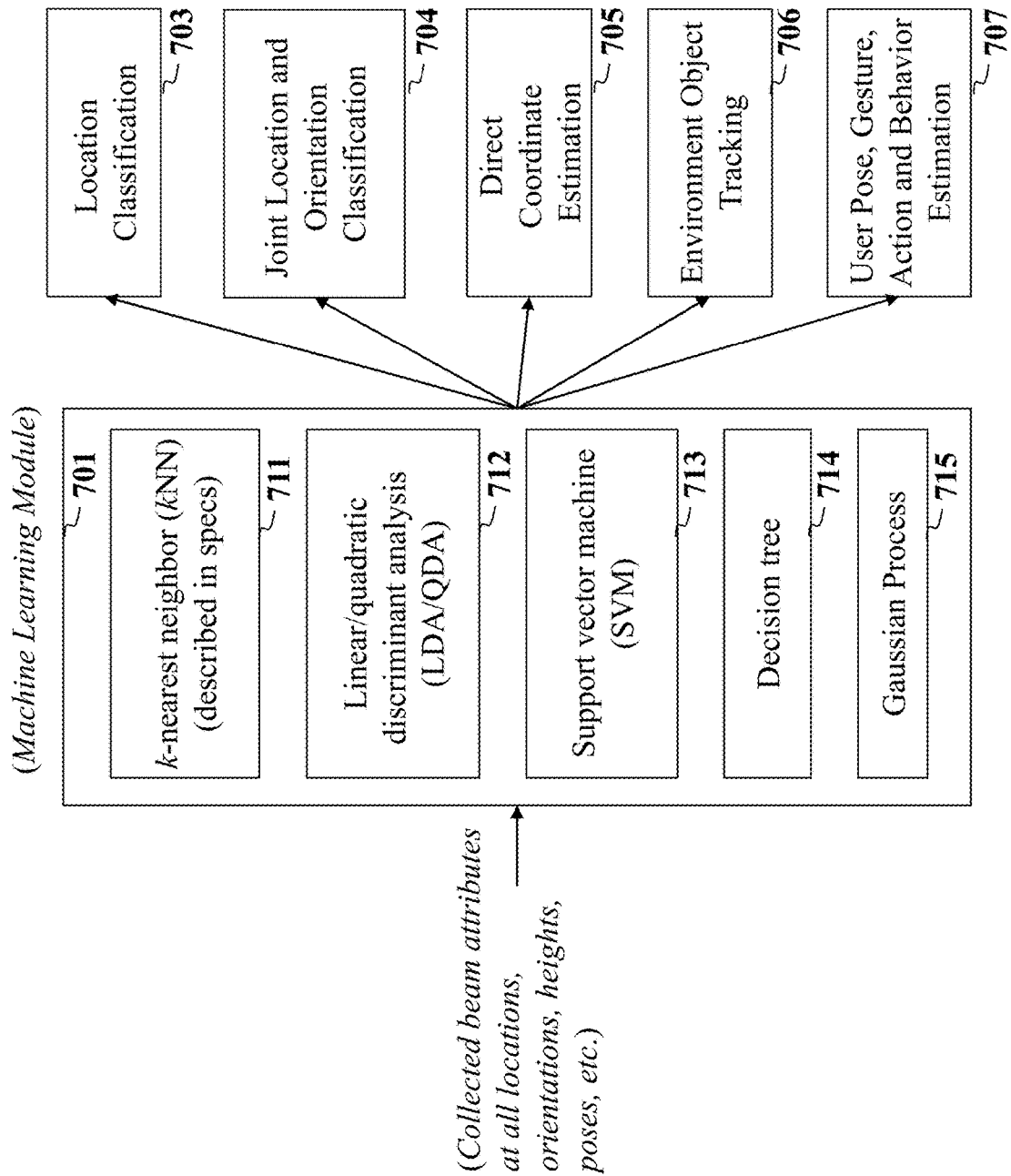
FIG. 7 is a block diagram illustrating machine learning approaches including kNN, LDA/QDA, SVM, GP, etc. to classify new fingerprinting measurements into one of training locations, orientations, poses, etc., according to some embodiments of the present disclosure.

FIG. 7 is a block diagram illustrating that when new fingerprinting measurements from an unknown location are available, the problem of interest is to, with a chosen performance metric, find a best match of the new measurements in the offline training dataset and determine its location and/or orientation, using machine learning methods, including linear/quadratic discriminant analysis (LDA/QDA), support vector machine (SVM), decision tree (DT)), the nearest neighboring-based method, Gaussian process, for classification and coordinate estimation. While some embodiments estimate states of radio devices such as locations and orientations, other embodiments are based on a recognition that mmWave beam signal can be sensitive to states of environment such as physical object locations, door openings, ambient users actions and occupancies such that the present disclosure can estimate those states of environment in a same manner of estimating states of the devices.

Still referring to FIG. 7, then only the location is of interest, we can simply repeat the above process by only using the location label from the training dataset. Similarly, one can apply other classification methods to the beam SNR measurements.

Deep Learning

Figure 8:
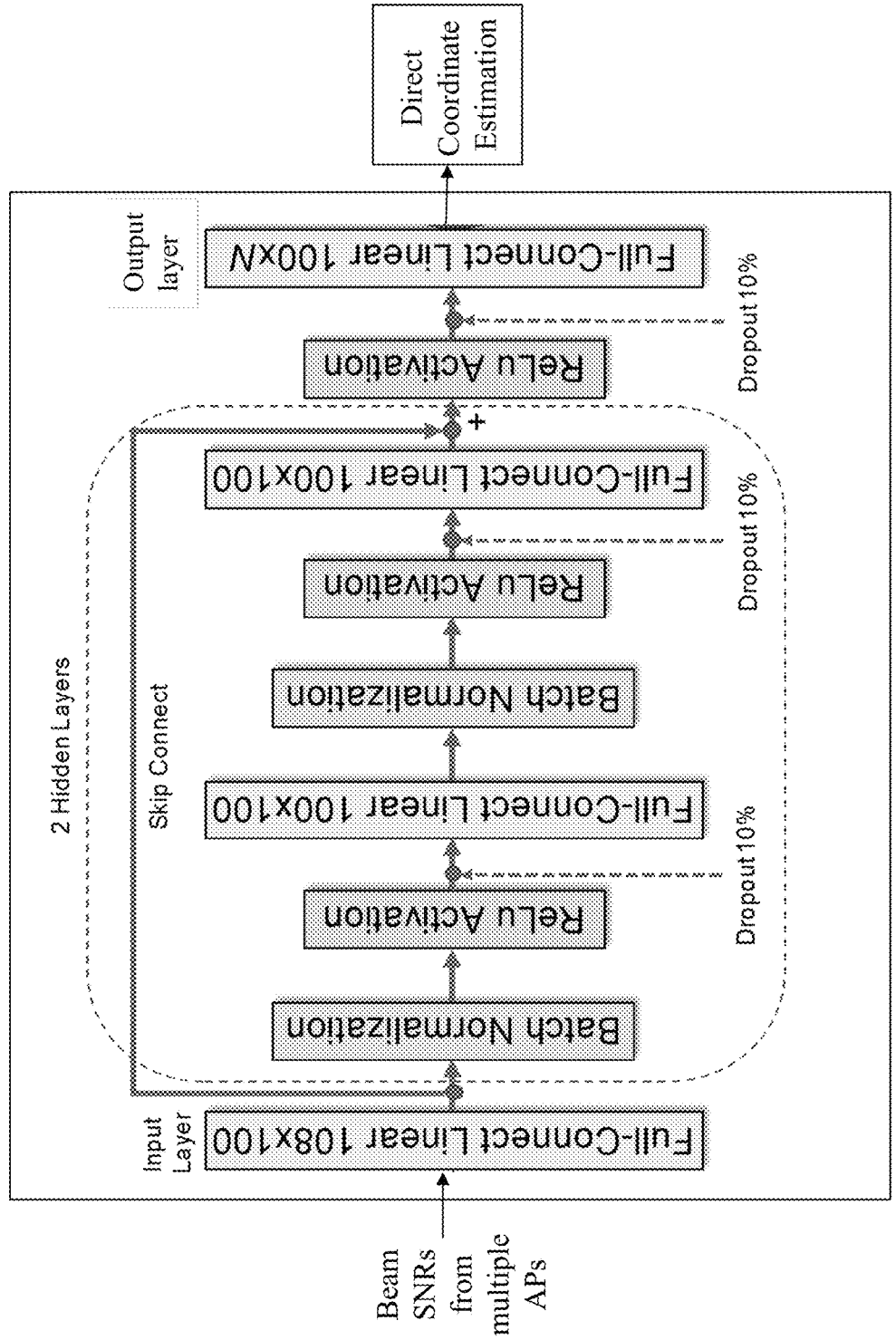
FIG. 8 is a schematic illustrating a DNN architecture for indoor localizations, according to some embodiments of the present disclosure.

FIG. 8 is a schematic illustrating a DNN architecture for localizations, according to some embodiments of the present disclosure. The DNN feeds beam SNRs information measured at the beam-training phase of COTS IEEE 802.11ad devices, which searches for the best beam pattern by sweeping multiple predefined beam profiles. When multiple APs exist nearby, makes possible to exploit beam SNRs from all APs to improve the localization accuracy.

When 36 beam sectors are available from three APs, 108 SNR information is fed into the input layer of the DNN, where the input layer first transforms to 100-node dimensions by fully connected linear layer. The DNN then employs two hidden layers having 100 nodes per layer, consisting of batch normalization layer, rectified linear unit (ReLU) activation layer with 10% dropout, and fully connected linear layer. The dropout is a technique to prevent over-fitting for improved generalizability. Additionally, considered is a skip connect jumping from the input of hidden layers to the output of hidden layers in order to learn residual gradient for improved training stability. A fully connected linear layer following an activation layer with dropout produces the output of the DNN.

Still referring to FIG. 8, the dimensionality of the output layer depends on the localization scenarios. Specifically, three localization scenarios are investigated; i) location identification, ii) joint location & orientation identification, and iii) location coordinate estimation. For the first two scenarios, the DNN is trained to minimize softmax cross-entropy loss to predict identification from multiple predefined location landmarks. For location identification, the dimension of output nodes is L while it is L×O for joint location and orientation identification. Whereas for the last scenario, the DNN produces estimated (x, y) coordinate value by training in the sense of mean-square error (MSE) loss. For this case, the number of output nodes is just two, representing (x, y).

For example, a Chainer library is used for the DNN implementation. DNN training was performed by adaptive momentum (Adam) stochastic gradient descent method with a learning rate of 0.001, and a mini-batch size of 100. The maximum number of epochs is 500 while early stopping with a patience of 20 was taken place.

Figure 9:
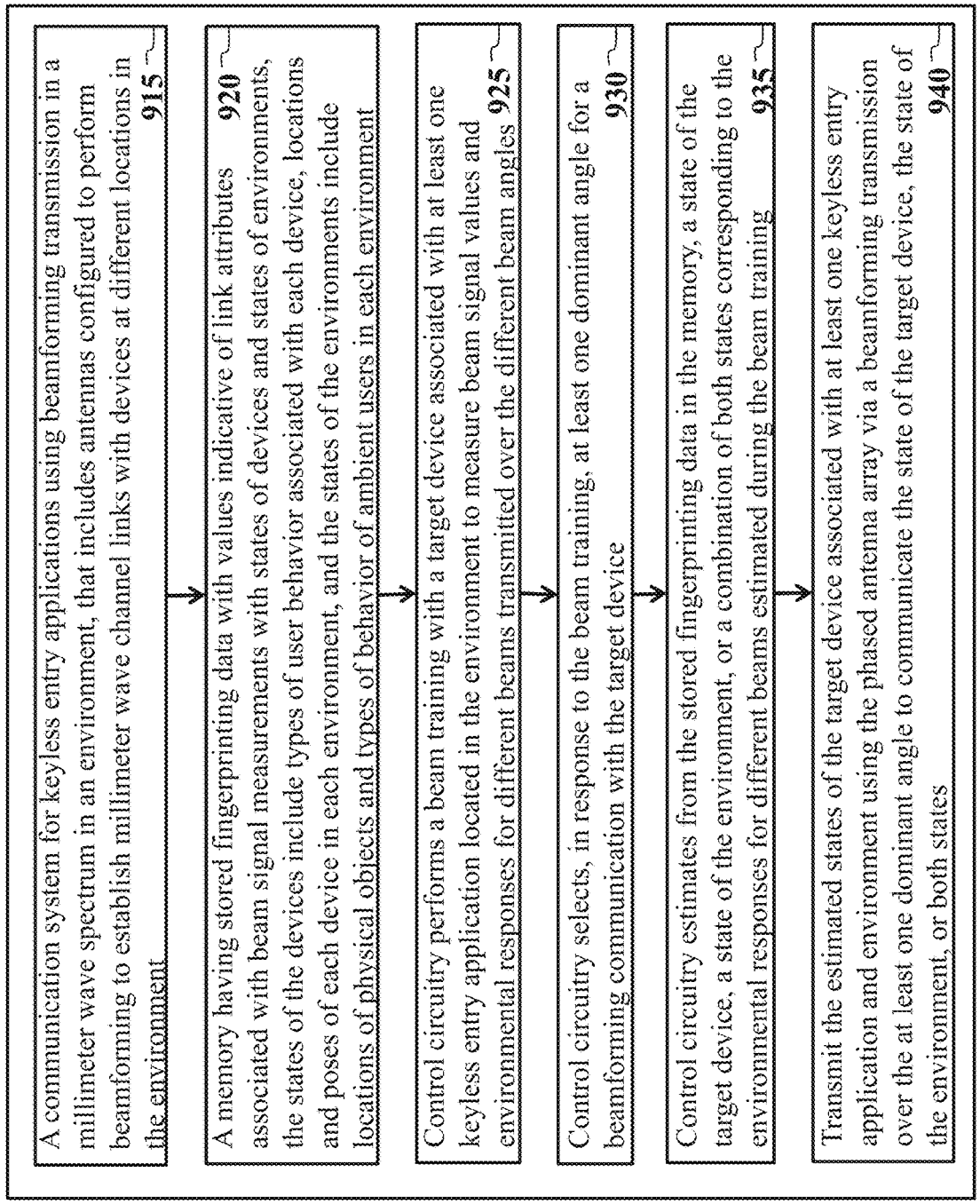
FIG. 9 is a block diagram illustrating another system, according to an embodiment of the present disclosure.

FIG. 9 is a block diagram of a method, according to an embodiment of the present disclosure.

Step 915 of FIG. 9 includes a communication system using beamforming transmission in a millimeter wave spectrum in an environment that includes antennas configured to perform beamforming to establish millimeter wave channel links with devices at different locations in the environment.

Step 920 of FIG. 9 includes a memory connected to the antennas, having stored fingerprinting data. The stored fingerprinting data include values indicative of link attributes associated with beam signal measurements with states of devices and states of environments. The states of the devices include types of user behavior associated with each device, locations and poses of each device in each environment. The states of the environments include locations of physical objects and types of behavior of ambient users in each environment.

Step 925 of FIG. 9 includes the control circuitry communicatively connected with the antennas and the memory, is configured to perform a beam training with a target device located in the environment to measure beam signal values and environmental responses for different beams transmitted over the different beam angles.

Step 930 of FIG. 9 includes the control circuitry selects, in response to the beam training, at least one dominant angle for a beamforming communication with the target device.

Step 935 of FIG. 9 includes the control circuitry estimates from the stored fingerprinting data in the memory, a state of the target device, a state of the environment, or a combination of both states corresponding to the environmental responses for different beams estimated during the beam training Step 940 of FIG. 9 includes the control circuitry transmits the estimated states of the target device and environment using the antennas via a beamforming transmission over the at least one dominant angle to communicate the state of the target device, the state of the environment, or both states.

FIG. 10A is a schematic illustrating by non-limiting example a computing apparatus 1000 that can be used to implement some techniques of the methods and systems, according to embodiments of the present disclosure. The computing apparatus or device 1000 represents various forms of digital computers, such as laptops, desktops, workstations, personal digital assistants, servers, blade servers, mainframes, and other appropriate computers.

The computing device 1000 can include a power source 1008, a processor 1009, a memory 1010, a storage device 1011, all connected to a bus 1050.

The power source 1008 can be one or more types of power, including battery, solar, wind, on-board power generator device, power generated from a device, i.e. car, train, etc. For example, there can be a power converter or power system that can converter generated power, i.e. solar, wind, self-generating power source via gasoline, gas, and the like, that may have a different voltage, current or phase that may need to be converted, i.e. 6V DC, 12V DC, etc., to a useable energy source, i.e. 120 A/C, whatever the power conversion maybe, for power to be provided for the intended purpose as related to embodiments of the present disclosure.

Further, a high-speed interface 1012, a low-speed interface 1013, high-speed expansion ports 1014 and low speed connection ports 1015, can be connected to the bus 1050. In addition, a low-speed expansion port 1016 is in connection with the bus 1050. Contemplated are various component configurations that may be mounted on a common motherboard, by non-limiting example, 1030, depending upon the specific application. Further still, an input interface 1017 can be connected via bus 1050 to an external receiver 1006 and an output interface 1018. A receiver 1019 can be connected to an external transmitter 1007 and a transmitter 1020 via the bus 1050. Also connected to the bus 1050 can be an external memory 1004, external sensors 1003, machine(s) 1002 and an environment 1001. Further, one or more external input/output devices 1205 can be connected to the bus 1050. A network interface controller (NIC) 1021 can be adapted to connect through the bus 1050 to a network 1022, wherein data or other data, among other things, can be rendered on a third party display device, third party imaging device, and/or third party printing device outside of the computer device 1000.

Contemplated is that the memory 1010 can store instructions that are executable by the computer device 1000, historical data, and any data that can be utilized by the methods and systems of the present disclosure. The memory 1010 can include random access memory (RAM), read only memory (ROM), flash memory, or any other suitable memory systems. The memory 1010 can be a volatile memory unit or units, and/or a non-volatile memory unit or units. The memory 1010 may also be another form of computer-readable medium, such as a magnetic or optical disk.

Still referring to FIG. 10A, a storage device 1011 can be adapted to store supplementary data and/or software modules used by the computer device 1000. For example, the storage device 1011 can store historical data and other related data as mentioned above regarding the present disclosure. Additionally, or alternatively, the storage device 1011 can store historical data similar to data as mentioned above regarding the present disclosure. The storage device 1011 can include a hard drive, an optical drive, a thumb-drive, an array of drives, or any combinations thereof. Further, the storage device 1011 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1009), perform one or more methods, such as those described above.

The system can be linked through the bus 1050 optionally to a display interface or user Interface (HMI) 1023 adapted to connect the system to a display device 1025 and keyboard 1024, wherein the display device 1025 can include a computer monitor, camera, television, projector, or mobile device, among others.

Still referring to FIG. 10A, the computer device 1000 can include a user input interface 1017 adapted to a printer interface (not shown) can also be connected through bus 1050 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1012 manages bandwidth-intensive operations for the computing device 1000, while the low-speed interface 1013 manages lower bandwidth-intensive operations. Such allocation of functions is an example only. In some implementations, the high-speed interface 1012 can be coupled to the memory 1010, a user interface (HMI) 1023, and to a keyboard 1024 and display 1025 (e.g., through a graphics processor or accelerator), and to the high-speed expansion ports 1014, which may accept various expansion cards (not shown) via bus 1050. In the implementation, the low-speed interface 1013 is coupled to the storage device 1011 and the low-speed expansion port 1015, via bus 1050. The low-speed expansion port 1015, which may include various communication ports (e.g., USB, Bluetooth, Ethernet, wireless Ethernet) may be coupled to one or more input/output devices 1005, and other devices a keyboard 1024, a pointing device (not shown), a scanner (not shown), or a networking device such as a switch or router, e.g., through a network adapter.

Still referring to FIG. 10A, the computing device 1200 may be implemented in a number of different forms, as shown in the figure. For example, it may be implemented as a standard server 1026, or multiple times in a group of such servers. In addition, it may be implemented in a personal computer such as a laptop computer 1027. It may also be implemented as part of a rack server system 1028. Alternatively, components from the computing device 1000 may be combined with other components in a mobile device (not shown), such as a mobile computing device of FIG. 10B. Each of such devices may contain one or more of the computing device and the mobile computing device, and an entire system may be made up of multiple computing devices communicating with each other.

FIG. 10B is a schematic illustrating a mobile computing apparatus that can be used to implement some techniques of the methods and systems, according to embodiments of the present disclosure. The mobile computing device 1099 includes a bus 1095 connecting a processor 1061, a memory 1062, an input/output device 1063, and a communication interface 1064, among other components. The bus 1095 can also be connected to a storage device 1265, such as a micro-drive or other device, to provide additional storage.

Referring to FIG. 10B, the processor 1061 can execute instructions within the mobile computing device, including instructions stored in the memory 1062. The processor 1061 may be implemented as a chipset of chips that include separate and multiple analog and digital processors. The processor 1061 may provide, for example, for coordination of the other components of the mobile computing device, such as control of user interfaces, applications run by the mobile computing device, and wireless communication by the mobile computing device 1000B. Contemplated are various component configurations that may be mounted on a common motherboard, by non-limiting example, 1099, depending upon the specific application.

The processor 1061 may communicate with a user through a control interface 1066 and a display interface 1067 coupled to the display 1068. The display 1068 may be, for example, a TFT (Thin-Film-Transistor Liquid Crystal Display) display or an OLED (Organic Light Emitting Diode) display, or other appropriate display technology. The display interface 1067 may comprise appropriate circuitry for driving the display 1068 to present graphical and other information to a user. The control interface 1066 may receive commands from a user and convert them for submission to the processor 1061. In addition, an external interface 1069 may provide communication with the processor 1061, to enable near area communication of the mobile computing device with other devices. The external interface 1069 may provide, for example, for wired communication in some implementations, or for wireless communication in other implementations, and multiple interfaces may be used.

Still referring to FIG. 10B, the memory 1062 stores information within the mobile computing device. The memory 1062 can be implemented as one or more of a computer-readable medium or media, a volatile memory unit or units, or a non-volatile memory unit or units. An expansion memory 1070 may also be provided and connected to the mobile computing device 1099 through an expansion interface 1069, which may include, for example, a SIMM (single in line memory module) card interface. The expansion memory 1070 may provide extra storage space for the mobile computing device 1099, or may also store applications or other information for the mobile computing device 1099. Specifically, the expansion memory 1070 may include instructions to carry out or supplement the processes described above, and may include secure information also. Thus, for example, the expansion memory 1070 may be providing as a security module for the mobile computing device 1099, and may be programmed with instructions that permit secure use of the mobile computing device. In addition, secure applications may be provided via the SIMM cards, along with additional information, such as placing identifying information on the SIMM card in a non-hackable manner.

The memory 1062 may include, for example, flash memory and/or NVRAM memory (non-volatile random access memory), as discussed below. In some implementations, instructions are stored in an information carrier, that the instructions, when executed by one or more processing devices (for example, processor), perform one or more methods, such as those described above. The instructions can also be stored by one or more storage devices, such as one or more computer or machine-readable mediums (for example, the memory 1062, the expansion memory 1070, or memory on the processor 1062). In some implementations, the instructions can be received in a propagated signal, for example, over the transceiver 1071 or the external interface 1069.

The mobile computing apparatus or device of FIG. 10B is intended to represent various forms of mobile devices, such as personal digital assistants, cellular telephones, smartphones, and other similar computing devices. The mobile computing device may communicate wirelessly through the communication interface 1064, which may include digital signal processing circuitry where necessary. The communication interface 1064 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1071 using a radio frequency. In addition, short-range communication may occur, such as using a Bluetooth, Wi-Fi, or other such transceiver (not shown). In addition, a GPS (Global Positioning System) receiver module 1073 may provide additional navigation and location related wireless data to the mobile computing device, which may be used as appropriate by applications running on the mobile computing device.

The mobile computing device may also communicate audibly using an audio codec 1072, which may receive spoken information from a user and convert it to usable digital information. The audio codec 1072 may likewise generate audible sound for a user, such as through a speaker, e.g., in a handset of the mobile computing device. Such sound may include sound from voice telephone calls, may include recorded sound (e.g., voice messages, music files, etc.) and may include sound generated by applications operating on the mobile computing device.

Still referring to FIG. 10B, the mobile computing device may be implemented in a number of different forms, as shown in the figure. For example, it may be implemented as a cellular telephone 1074. It may also be implemented as part of a smart-phone 1075, personal digital assistant, or other similar mobile device.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A communication system for keyless entry applications uses beamforming transmission in a millimeter wave spectrum in an environment, that includes an access point and a mobile access point mounted in or on a vehicle, where the access point and the mobile access point include a phased antenna array configured to perform beamforming to establish millimeter wave channel links between the access point and the mobile access point at different locations in the environment, the communication system comprising:

memory connected to the access point phased antenna array along with stored data, and a memory connected to the mobile access point phased antenna array along with stored data, the stored data include values indicative of signal to noise ratio (SNR) measurements of a set of beams emitted at different beam angles by the access point and the mobile access point phased antenna arrays and measured at a set of locations, that provide for a mapping between different combinations of SNR values of the set of beams and the set of locations, such that a location from the set of locations is mapped to a unique combination of the SNR values of the set of beams;

control circuitry communicatively connected with the access point and the mobile access point phased antenna arrays and the memories, the control circuitry configured to:

perform a beam training with a target device associated with at least one keyless entry application located in the environment to estimate SNR values for different beams transmitted over the different beam angles;

select, in response to the beam training, at least one dominant angle for a beamforming communication with the target device;

estimate from the mapping stored in the memories, a location of the target device corresponding to the SNR values for different beams estimated during the beam training; and transmit the estimated location of the target device associated with the at least one keyless entry application using the phased antenna array via a beamforming transmission over the at least one dominant angle, wherein the stored data include each location from the set of locations that is mapped to the unique combination of the link attributes of the set of beams for a period of time, such that the unique combination of the link attributes of the set of beams at that period of time further provides information associated with types of behavior of the device at the location for that period of time, poses of the device at the location for that period of time, locations of physical objects in the environment for that period of time, and types of behavior of ambient users in the environment for that period of time.

2. The communication system of claim 1, wherein the phased antenna array includes antenna beam sectors, such that the phased antenna array iteratively sweeps the environment, sequentially, to establish at least one millimeter wave link with the devices and the target device in the environment.

3. The communication system of claim 1, wherein stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams.

4. The communication system of claim 3, wherein the link attributes further includes one or a combination of RSSI measurements or CSI measurements.

5. The communication system of claim 1, wherein the control circuitry is configured to control a mechanical positioner to mechanically adjust an orientation of the phased antenna array and/or control a beam steering circuitry to steer the millimeter wave signals towards the location of the target device.

6. The communication system of claim 1, wherein each device of the devices includes a phased antenna array having antenna beam sectors that sweep the environment, such that some devices of the devices are commercial off-the-shelf (COTS) devices.

7. The communication system of claim 1, wherein the target device is associated with an electronic device capable of establishing a link with the phased array of antennas, such that the target device is further associated with one of a robot, a human, a computer, a computer like device or an electronic device adaptable to a human.

8. A electronic system for keyless entry applications using beamforming transmission in a millimeter wave spectrum is configured to communicate with devices and a target device in an environment, the devices includes at least one access point and a mobile access point mounted in or on a vehicle, such that the at least one access point and the mobile access point include a phased antenna array configured to perform beamforming to establish millimeter wave channel links between the at least one access point and the mobile access point at different locations in the environment, the electronic system comprising:
  a memory connected to the antennas, having stored data, the stored data include values indicative of signal to noise ratio (SNR) measurements of a set of beams emitted at different beam angles by the antennas and measured at a set of locations, that provide for a mapping between different combinations of SNR values of the set of beams and the set of locations, such that a location from the set of locations is mapped to a unique combination of the SNR values of the set of beams;
  control circuitry connected with the antennas and the memory, is configured to: perform a beam training with the target device associated with at least one keyless entry application located in the environment to estimate link attributes for different beams transmitted over the different beam angles;
  select, in response to the beam training, at least one dominant angle for a beamforming communication with the target device;
  estimate from the mapping stored in the memory, a location of the target device corresponding to the SNR values for different beams estimated during the beam training; and
  transmit the estimated location of the target device associated with the at least one keyless entry application using the antennas via a beamforming transmission over the at least one dominant angle, wherein stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams.

9. The electronic system of claim 8, wherein the antennas are arranged in a phased antenna array, and configured to transmit and receive millimeter wave signals with the devices at different locations in the environment.

10. The electronic system of claim 9, further comprising a mechanical positioner coupled to the phased antenna array, the control circuitry configured to mechanically adjust a position of at least one antenna in the phased antenna array to direct the millimeter wave signals towards a location of the target device by controlling the mechanical positioner.

11. The electronic system of claim 10, further comprising beam steering circuitry coupled to the phased antenna array, the control circuitry configured to steer the millimeter wave signals towards the location of the target device by controlling the beam steering circuitry, and steer the millimeter wave signals towards the location of the target device after the mechanical positioner mechanically adjusts the position of the at least one antenna in the phased antenna array.

12. A method using a communication system for keyless entry applications having beamforming transmission in a millimeter wave spectrum in an environment, that includes a phased antenna array configured to perform beamforming to establish millimeter wave channel links with devices at different locations in the environment, comprising:
  performing a beam training with a target device located in the environment to estimate link attributes for different beams transmitted over the different beam angles using control circuitry connected with the antennas, the control circuitry is configured for:
  selecting, in response to the beam training, at least one dominant angle for a beamforming communication with a target device associated with at least one keyless entry application;
  accessing a memory connected to the phased antenna array, the memory having stored data that include values indicative of link attributes of a set of beams emitted at different beam angles by the phased antenna array and measured at a set of locations in the environment, wherein the stored values provide a mapping between different combinations of link attributes of the set of beams and the set of locations, such that a location from the set of locations is mapped to a unique combination of the link attributes of the set of beams;
  estimating from the mapping stored in the memory, to a location of the target device corresponding to the link attributes for different beams estimated during the beam training; and
  transmitting the estimated location of the target device associated with the at least one keyless entry application using the phased antenna array via a beamforming transmission over the at least one dominant angle, wherein the stored data includes fingerprinting data, the fingerprinting data include each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

13. The method of claim 12, wherein the target device is associated with an electronic device capable of establishing a link with the phased array of antennas, such that the target device is further associated with one of a robot, a human, a computer, a computer like device or an electronic device adaptable to a human.

14. A communication system for keyless entry applications uses using beamforming transmission in a millimeter wave spectrum in an environment, that includes antennas configured to perform beamforming to establish millimeter wave channel links with devices at different locations in the environment, comprising:
- a memory connected to the antennas, having stored fingerprinting data, the stored fingerprinting data include values indicative of link attributes associated with beam signal measurements with states of devices and states of environments, the states of the devices include types of user behavior associated with each device, locations and poses of each device in each environment, and the states of the environments include locations of physical objects and types of behavior of ambient users in each environment;
- control circuitry communicatively connected with the antennas and the memory, is configured to:
- perform a beam training with a target device associated with at least one keyless entry application located in the environment to measure beam signal values and environmental responses for different beams transmitted over the different beam angles;
- select, in response to the beam training, at least one dominant angle for a beamforming communication with the target device;
- estimate from the stored fingerprinting data in the memory, a state of the target device, a state of the environment, or a combination of both states corresponding to the environmental responses for different beams estimated during the beam training; and
- transmit the estimated states of the target device associated with the at least one keyless entry application and environment using the antennas via a beamforming transmission over the dominant angle to communicate the state of the target device, the state of the environment, or both states, wherein stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams.

15. The communication system of claim 14, wherein the link attributes includes one or a combination of, beam signal to noise ratio (SNR) measurements, beam received signal strength indicator measurements, beam channel state information (CSI) measurements, beam patterns or beam sequencing, and wherein each device is associated with a user, such that the user is one of a robot, a human, a computer, a computer like device or an electronic device adaptable to a human.

16. A method using a communication system for keyless entry applications uses having beamforming transmission in a millimeter wave spectrum in an environment, that includes antennas configured to perform beamforming to establish millimeter wave channel links with devices at different locations in the environment, comprising:
- performing a beam training with a target device associated with at least one keyless entry application located in an environment to measure beam signal values and environmental responses for different beams transmitted over the different beam angles using control circuitry connected with the antennas, the control circuitry is configured for:
- selecting, in response to the beam training, at least one dominant angle for a beamforming communication with the target device;
- accessing a memory connected to the antennas, the memory having stored fingerprinting data that include values indicative of link attributes associated with beam signal measurements with states of devices and states of environments, the states of the devices include types of user behavior associated with each device, locations and poses of each device in each environment, and wherein the states of the environments include locations of physical objects and types of behavior of ambient users in each environment;
- estimating from the mapping stored fingerprinting data in the memory, a state of the target device, a state of the environment, or a combination of both states corresponding to the environmental responses for different beams estimated during the beam training; and
- transmitting the estimated states of the target device associated with the at least one keyless entry application and environment using the antennas via a beamforming transmission over the at least one dominant angle to communicate the state of the target device, the state of the environment, or both states, wherein the stored data includes fingerprinting data, the fingerprinting data include each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

17. A method of claim 16, wherein the link attributes includes one or a combination of, beam signal to noise ratio (SNR) measurements, beam received signal strength indicator measurements, beam CSI measurements, beam patterns or beam sequencing, and wherein each device is associated with a user, such that the user is one of a robot, a human, a computer, a computer like device or an electronic device adaptable to a human.

18. The method of claim 16, wherein the antennas are arranged in a phased antenna array, and configured to transmit and receive millimeter wave signals with the devices at different locations in the environment.

* * * * *